(12) United States Patent
Lyu et al.

(10) Patent No.: US 12,256,440 B2
(45) Date of Patent: *Mar. 18, 2025

(54) METHOD AND DEVICE FOR NODE FOR WIRELESS COMMUNICATION

(71) Applicant: QUECTEL WIRELESS SOLUTIONS CO., LTD., Shanghai (CN)

(72) Inventors: Ling Lyu, Shanghai (CN); Zheng Zhao, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/905,692

(22) Filed: Oct. 3, 2024

(65) Prior Publication Data

US 2025/0039944 A1 Jan. 30, 2025

Related U.S. Application Data

(63) Continuation of application No. 18/731,177, filed on May 31, 2024, now Pat. No. 12,114,371, which is a
(Continued)

(51) Int. Cl.
*H04W 74/0833* (2024.01)
*H04W 74/08* (2024.01)

(52) U.S. Cl.
CPC ... *H04W 74/0833* (2013.01); *H04W 74/0875* (2013.01); *H04W 74/0891* (2013.01)

(58) Field of Classification Search
CPC ......... H04W 74/0833; H04W 74/0875; H04W 74/0891
See application file for complete search history.

(56) References Cited

U.S. PATENT DOCUMENTS

| 12,114,371 B1* | 10/2024 | Lyu | H04W 74/0875 |
| 2020/0281018 A1* | 9/2020 | Li | H04W 8/005 |

(Continued)

FOREIGN PATENT DOCUMENTS

| CN | 112788762 | 5/2021 |
| CN | 116347648 | 6/2023 |
| WO | WO 2023071843 | 5/2023 |

OTHER PUBLICATIONS

3GPP TS 38.331 V17.4.0, "3rd Generation Partnership Project; Technical Specification Group Radio Access Network; NR; Radio Resource Control (RRC) protocol specification (Release 17)," Mar. 2023, 1323 pages.
(Continued)

*Primary Examiner* — Kashif Siddiqui
(74) *Attorney, Agent, or Firm* — Fish & Richardson P.C.

(57) ABSTRACT

Provided are a method and a device applicable to a node for wireless communication. One example method includes: receiving first information, the first information comprises information indicating X physical random access channel (PRACH) occasions, wherein the X PRACH occasions are mapped to Q PRACH occasion groups, X is a positive integer greater than 1, and Q is a positive integer; and receiving second information, the second information comprises a plurality of candidate values, wherein the X PRACH occasions are mapped to the Q PRACH occasion groups based at least one of a priority of a candidate value associated with a respective PRACH occasion group or a quantity of PRACH occasion groups respectively corresponding to each candidate value of the plurality of candidate values.

20 Claims, 6 Drawing Sheets

Related U.S. Application Data continuation of application No. PCT/CN2023/104449, filed on Jun. 30, 2023.

(56) References Cited

U.S. PATENT DOCUMENTS

| | | | |
|---|---|---|---|
| 2021/0051672 A1 | 2/2021 | Rastegardoost et al. | |
| 2021/0120592 A1* | 4/2021 | Takahashi | H04L 5/0053 |
| 2022/0369375 A1* | 11/2022 | Lin | H04W 74/004 |
| 2022/0408292 A1 | 12/2022 | He et al. | |
| 2023/0276504 A1* | 8/2023 | Kim | H04W 74/0833 370/329 |
| 2023/0397256 A1* | 12/2023 | Wang | H04B 7/0695 |

OTHER PUBLICATIONS

China Telecom, "Revised WID on Further NR coverage enhancements," 3GPP TSG RAN Meeting #96, RP-221858, Budapest, Hungary, Jun. 6-9, 2022, 5 pages.

Huawei et al., "Discussion on PRACH coverage enhancements," 3GPP TSG-RAN WG1 Meeting #112bis-e, R1-2302350, e-Meeting, Apr. 17-26, 2023, 18 pages.

International Search Report and Written Opinion in International Appln. No. PCT/CN2023/104449, mailed on Dec. 20, 2023, 15 pages (with English machine translation).

Nokia, "On 2-step RACH Channel Structure," 3GPP TSG RAN WG1 #97, R1-1906746, Reno, USA, May 13-17, 2019, 16 pages.

Office Action in Chinese Appln. No. 202380010755.7, mailed on Apr. 27, 2024, 20 pages (with English translation).

Qualcomm Incorporated, "PRACH Coverage Enhancement," 3GPP TSG-RAN WG1 #112-bis-e, R1-2303615, E-meeting, Apr. 17-21, 2023, 4 pages.

Notice of Allowance in Chinese Appln. No. 202380010755.7, mailed on Sep. 29, 2024, 6 pages (with English machine translation).

Office Action in Chinese Appln. No. 202380010755.7, mailed on Jul. 6, 2024, 9 pages (with English machine translation).

* cited by examiner

METHOD AND DEVICE FOR NODE FOR WIRELESS COMMUNICATION

CROSS-REFERENCE TO RELATED APPLICATIONS

This application is a continuation of U.S. patent application Ser. No. 18/731,177, filed on May 31, 2024, which is a continuation of International Application No. PCT/CN2023/104449, filed on Jun. 30, 2023. All of the afore-mentioned patent applications are hereby incorporated by reference in their entireties.

TECHNICAL FIELD

Embodiments of the present disclosure relate to the field of communication technology, and in particular to a method and a device applicable to a node for wireless communication.

BACKGROUND

In order to improve the coverage performance of a physical random access channel (PRACH), some communication systems (such as a new radio (NR) system) introduce the scheme of multiple PRACH transmission. In the scheme of multiple PRACH transmission, a PRACH occasion (RO) may be mapped to a RO group (ROG), so as to transmit a plurality of PRACHs on the ROG. In view of this, how to map a RO to a ROG is a problem to be solved. The mapping scheme of RO to ROG may bring an influence to the resource allocation of multiple PRACH transmission, or may lead to a large quantity of orphan ROs, resulting in resource waste.

SUMMARY

Embodiments of the present disclosure provide a method and a device applicable to a node for wireless communication. Aspects of the present disclosure will be illustrated below.

In a first aspect, a first node for wireless communication is provided, including: a first receiver configured to receive first information, the first information is used to determine X PRACH occasions, where the X PRACH occasions are mapped to Q PRACH occasion groups, X is a positive integer greater than 1, and Q is a positive integer; and a second receiver configured to receive second information, the second information is used to determine a plurality of candidate values, where quantity of PRACH occasions in each of the Q PRACH occasion groups is a corresponding candidate value of the plurality of candidate values. The plurality of candidate values include a first candidate value and a second candidate value, and a greater one of the first candidate value and the second candidate value is prioritized for mapping of the X PRACH occasions to the Q PRACH occasion groups; and/or the mapping of the X PRACH occasions to the Q PRACH occasion groups is related to quantity of PRACH occasion groups respectively corresponding to each candidate value of the plurality of candidate values.

In some embodiments, the first node further includes: a first transmitter configured to transmit a plurality of random access preambles on a first PRACH occasion group. The first PRACH occasion group is one of the Q PRACH occasion groups, and a first sequence is used to generate each random access preamble of the plurality of random access preambles.

In some embodiments, the X PRACH occasions are within a first cycle.

In some embodiments, the PRACH occasions in each of the Q PRACH occasion groups are orthogonal to each other in time domain; or the PRACH occasions in each of the Q PRACH occasion groups are related to a same synchronization signal block; or the PRACH occasions in each of the Q PRACH occasion groups are orthogonal to each other in time domain and are related to a same synchronization signal block.

In some embodiments, the plurality of candidate values are used, in a descending order, for the mapping of the X PRACH occasions to the Q PRACH occasion groups.

In some embodiments, each occasion group sub-set of a plurality of PRACH occasion group sub-sets includes Q1 respective PRACH occasion groups of the Q PRACH occasion groups, each of the plurality of candidate values corresponds to at least one respective PRACH occasion group of the Q1 respective PRACH occasion groups in each occasion group sub-set of the plurality of PRACH occasion group sub-sets, and any two occasion group sub-sets of the plurality of PRACH occasion group sub-sets corresponding to any one of the plurality of candidate values have same quantity of PRACH occasion groups.

In some embodiments, quantity of the at least one respective PRACH occasion group in each occasion group sub-set of the plurality of PRACH occasion group sub-sets corresponding to one respective candidate value of the plurality of candidate values corresponds to a value, and values corresponding to the plurality of candidate values are in a first proportion.

In some embodiments, each occasion group sub-set of the plurality of PRACH occasion group sub-sets includes X1 respective PRACH occasions of the X PRACH occasions, and in each occasion group sub-set of the plurality of PRACH occasion group sub-sets, the plurality of candidate values are used, in a descending order, for mapping of the X1 respective PRACH occasions to the Q1 respective PRACH occasion groups.

In some embodiments, the mapping of the X PRACH occasions to the Q PRACH occasion groups is related to one or more of: quantity of frequency division multiplexed PRACH occasions in a time instance; quantity of synchronization signal blocks associated with each of the X PRACH occasions; and quantity of random access preambles corresponding to each of a plurality of synchronization signal blocks associated with the X PRACH occasions.

In some embodiments, the first node further includes: a third receiver configured to receive third information used to determine quantity of PRACH occasion groups corresponding to at least one candidate value of the plurality of candidate values.

In some embodiments, quantity of random access preambles corresponding to at least one candidate value of the plurality of candidate values is used to determine the Q PRACH occasion groups.

In some embodiments, the first information is used to determine at least one of: a respective quantity of synchronization signal blocks corresponding to each PRACH occasion of the X PRACH occasions; and quantity of random access preambles corresponding to the synchronization signal blocks corresponding to each PRACH occasion of the X PRACH occasions.

In some embodiments, each of the Q PRACH occasion groups includes a respective plurality of PRACH occasions, and at least two PRACH occasion groups of the Q PRACH occasion groups include at least one PRACH occasion different from each other, respectively.

In some embodiments, each of the Q PRACH occasion groups includes a respective plurality of PRACH occasions, the Q PRACH occasion groups correspond to a plurality of random access preambles, and random access preambles corresponding to at least two of the Q PRACH occasion groups are different from each other.

In a second aspect, a second node for wireless communication is provided, including: a second transmitter, configured to transmit first information used to determine X PRACH occasions, where the X PRACH occasions are mapped to Q PRACH occasion groups, X is a positive integer greater than 1, and Q is a positive integer; and a third transmitter, configured to transmit second information used to determine a plurality of candidate values, where quantity of PRACH occasions in each of the Q PRACH occasion groups is a corresponding candidate value of the plurality of candidate values. The plurality of candidate values include a first candidate value and a second candidate value, and a greater one of the first candidate value and the second candidate value is prioritized for mapping of the X PRACH occasions to the Q PRACH occasion groups; and/or the mapping of the X PRACH occasions to the Q PRACH occasion groups is related to quantity of PRACH occasion groups respectively corresponding to each candidate value of the plurality of candidate values.

In some embodiments, the second node further includes: a fourth receiver configured to receive a plurality of random access preambles transmitted on a first PRACH occasion group. The first PRACH occasion group is one of the Q PRACH occasion groups, and a first sequence is used to generate each random access preamble of the plurality of random access preambles.

In some embodiments, the X PRACH occasions are within a first cycle.

In some embodiments, the PRACH occasions in each of the Q PRACH occasion groups are orthogonal to each other in time domain; or the PRACH occasions in each of the Q PRACH occasion groups are related to a same synchronization signal block; or the PRACH occasions in each of the Q PRACH occasion groups are orthogonal to each other in time domain and are related to a same synchronization signal block.

In some embodiments, the plurality of candidate values are used, in a descending order, for the mapping of the X PRACH occasions to the Q PRACH occasion groups.

In some embodiments, each occasion group sub-set of a plurality of PRACH occasion group sub-sets includes Q1 respective PRACH occasion groups of the Q PRACH occasion groups, each of the plurality of candidate values corresponds to at least one respective PRACH occasion group of the Q1 respective PRACH occasion groups in each occasion group sub-set of the plurality of PRACH occasion group sub-sets, and any two occasion group sub-sets of the plurality of PRACH occasion group sub-sets corresponding to any one of the plurality of candidate values have same quantity of PRACH occasion groups.

In some embodiments, quantity of the at least one respective PRACH occasion group in each occasion group sub-set of the plurality of PRACH occasion group sub-sets corresponding to one respective candidate value of the plurality of candidate values corresponds to a value, and values corresponding to the plurality of candidate values are in a first proportion.

In some embodiments, each occasion group sub-set of the plurality of PRACH occasion group sub-sets includes X1 respective PRACH occasions of the X PRACH occasions, and in each occasion group sub-set of the plurality of PRACH occasion group sub-sets, the plurality of candidate values are used, in a descending order, for mapping of the X1 respective PRACH occasions to the Q1 respective PRACH occasion groups.

In some embodiments, the mapping of the X PRACH occasions to the Q PRACH occasion groups is related to one or more of: quantity of frequency division multiplexed PRACH occasions in a time instance; quantity of synchronization signal blocks associated with each of the X PRACH occasions; and quantity of random access preambles corresponding to each of a plurality of synchronization signal blocks associated with the X PRACH occasions.

In some embodiments, the second node further includes: a fourth transmitter, configured to transmit third information used to determine quantity of PRACH occasion groups corresponding to at least one candidate value of the plurality of candidate values.

In some embodiments, quantity of random access preambles corresponding to at least one candidate value of the plurality of candidate values is used to determine the Q PRACH occasion groups.

In some embodiments, at least one PRACH occasion group corresponding to each of the plurality of candidate values is mapped in a first mapping order, and the first mapping order includes one or more of: an increment order of indexes of random access preambles, an increment order of frequency resources, and an increment order of time resources.

In some embodiments, the first information is used to determine at least one of: a respective quantity of synchronization signal blocks corresponding to each PRACH occasion of the X PRACH occasions; and quantity of random access preambles corresponding to the synchronization signal blocks corresponding to each PRACH occasion of the X PRACH occasions.

In some embodiments, each of the Q PRACH occasion groups includes a respective plurality of PRACH occasions, and at least two PRACH occasion groups of the Q PRACH occasion groups include at least one PRACH occasion different from each other, respectively.

In some embodiments, each of the Q PRACH occasion groups includes a respective plurality of PRACH occasions, the Q PRACH occasion groups correspond to a plurality of random access preambles, and random access preambles corresponding to at least two of the Q PRACH occasion groups are different from each other.

In a third aspect, a method for wireless communication and applicable to a first node is provided, including: receiving first information used to determine X PRACH occasions, where the X PRACH occasions are mapped to Q PRACH occasion groups, X is a positive integer greater than 1, and Q is a positive integer; and receiving second information used to determine a plurality of candidate values, where quantity of PRACH occasions in each of the Q PRACH occasion groups is a corresponding candidate value of the plurality of candidate values. The plurality of candidate values include a first candidate value and a second candidate value, and a greater one of the first candidate value and the second candidate value is prioritized for mapping of the X PRACH occasions to the Q PRACH occasion groups; and/or the mapping of the X PRACH occasions to the Q PRACH occasion groups is related to quantity of PRACH occasion groups respectively corresponding to each candidate value of the plurality of candidate values.

In some embodiments, the method further includes: transmitting a plurality of random access preambles on a first PRACH occasion group. The first PRACH occasion group is one of the Q PRACH occasion groups, and a first sequence is used to generate each random access preamble of the plurality of random access preambles.

In some embodiments, the X PRACH occasions are within a first cycle.

In some embodiments, the PRACH occasions in each of the Q PRACH occasion groups are orthogonal to each other in time domain; or the PRACH occasions in each of the Q PRACH occasion groups are related to a same synchronization signal block; or the PRACH occasions in each of the Q PRACH occasion groups are orthogonal to each other in time domain and are related to a same synchronization signal block.

In some embodiments, the plurality of candidate values are used, in a descending order, for the mapping of the X PRACH occasions to the Q PRACH occasion groups.

In some embodiments, each occasion group sub-set of a plurality of PRACH occasion group sub-sets includes Q1 respective PRACH occasion groups of the Q PRACH occasion groups, each of the plurality of candidate values corresponds to at least one respective PRACH occasion group of the Q1 respective PRACH occasion groups in each occasion group sub-set of the plurality of PRACH occasion group sub-sets, and any two occasion group sub-sets of the plurality of PRACH occasion group sub-sets corresponding to any one of the plurality of candidate values have same quantity of PRACH occasion groups.

In some embodiments, quantity of the at least one respective PRACH occasion group in each occasion group sub-set of the plurality of PRACH occasion group sub-sets corresponding to one respective candidate value of the plurality of candidate values corresponds to a value, and values corresponding to the plurality of candidate values are in a first proportion.

In some embodiments, each occasion group sub-set of the plurality of PRACH occasion group sub-sets includes X1 respective PRACH occasions of the X PRACH occasions, and in each occasion group sub-set of the plurality of PRACH occasion group sub-sets, the plurality of candidate values are used, in a descending order, for mapping of the X1 respective PRACH occasions to the Q1 respective PRACH occasion groups.

In some embodiments, the mapping of the X PRACH occasions to the Q PRACH occasion groups is related to one or more of: quantity of frequency division multiplexed PRACH occasions in a time instance; quantity of synchronization signal blocks associated with each of the X PRACH occasions; and quantity of random access preambles corresponding to each of a plurality of synchronization signal blocks associated with the X PRACH occasions.

In some embodiments, the method further includes: receiving third information used to determine quantity of PRACH occasion groups corresponding to at least one candidate value of the plurality of candidate values.

In some embodiments, quantity of random access preambles corresponding to at least one candidate value of the plurality of candidate values is used to determine the Q PRACH occasion groups.

In some embodiments, at least one PRACH occasion group corresponding to each of the plurality of candidate values is mapped in a first mapping order, and the first mapping order includes one or more of: an increment order of indexes of random access preambles, an increment order of frequency resources, and an increment order of time resources.

In some embodiments, the first information is used to determine at least one of: a respective quantity of synchronization signal blocks corresponding to each PRACH occasion of the X PRACH occasions; and quantity of random access preambles corresponding to the synchronization signal blocks corresponding to each PRACH occasion of the X PRACH occasions.

In some embodiments, each of the Q PRACH occasion groups includes a respective plurality of PRACH occasions, and at least two PRACH occasion groups of the Q PRACH occasion groups include at least one PRACH occasion different from each other, respectively.

In some embodiments, each of the Q PRACH occasion groups includes a respective plurality of PRACH occasions, the Q PRACH occasion groups correspond to a plurality of random access preambles, and random access preambles corresponding to at least two of the Q PRACH occasion groups are different from each other.

In a fourth aspect, a method for wireless communication and applicable to a second node is provided, including: transmitting first information used to determine X PRACH occasions, where the X PRACH occasions are mapped to Q PRACH occasion groups, X is a positive integer greater than 1, and Q is a positive integer; and transmitting second information used to determine a plurality of candidate values, where quantity of PRACH occasions in each of the Q PRACH occasion groups is a corresponding candidate value of the plurality of candidate values. The plurality of candidate values include a first candidate value and a second candidate value, and a greater one of the first candidate value and the second candidate value is prioritized for mapping of the X PRACH occasions to the Q PRACH occasion groups; and/or the mapping of the X PRACH occasions to the Q PRACH occasion groups is related to quantity of PRACH occasion groups respectively corresponding to each candidate value of the plurality of candidate values.

In some embodiments, the method further includes: receiving a plurality of random access preambles transmitted on a first PRACH occasion group. The first PRACH occasion group is one of the Q PRACH occasion groups, and a first sequence is used to generate each random access preamble of the plurality of random access preambles.

In some embodiments, the X PRACH occasions are within a first cycle.

In some embodiments, the PRACH occasions in each of the Q PRACH occasion groups are orthogonal to each other in time domain; or the PRACH occasions in each of the Q PRACH occasion groups are related to a same synchronization signal block; or the PRACH occasions in each of the Q PRACH occasion groups are orthogonal to each other in time domain and are related to a same synchronization signal block.

In some embodiments, the plurality of candidate values are used, in a descending order, for the mapping of the X PRACH occasions to the Q PRACH occasion groups.

In some embodiments, each occasion group sub-set of a plurality of PRACH occasion group sub-sets includes Q1 respective PRACH occasion groups of the Q PRACH occasion groups, each of the plurality of candidate values corresponds to at least one respective PRACH occasion group of the Q1 respective PRACH occasion groups in each occasion group sub-set of the plurality of PRACH occasion group sub-sets, and any two occasion group sub-sets of the plurality of PRACH occasion group sub-sets corresponding to any one of the plurality of candidate values have same quantity of PRACH occasion groups.

In some embodiments, quantity of the at least one respective PRACH occasion group in each occasion group sub-set of the plurality of PRACH occasion group sub-sets corresponding to one respective candidate value of the plurality of candidate values corresponds to a value, and values corresponding to the plurality of candidate values are in a first proportion.

In some embodiments, each occasion group sub-set of the plurality of PRACH occasion group sub-sets includes X1 respective PRACH occasions of the X PRACH occasions, and in each occasion group sub-set of the plurality of PRACH occasion group sub-sets, the plurality of candidate values are used, in a descending order, for mapping of the X1 respective PRACH occasions to the Q1 respective PRACH occasion groups.

In some embodiments, the mapping of the X PRACH occasions to the Q PRACH occasion groups is related to one or more of: quantity of frequency division multiplexed PRACH occasions in a time instance; quantity of synchronization signal blocks associated with each of the X PRACH occasions; and quantity of random access preambles corresponding to each of a plurality of synchronization signal blocks associated with the X PRACH occasions.

In some embodiments, the method further includes: transmitting third information used to determine quantity of PRACH occasion groups corresponding to at least one candidate value of the plurality of candidate values.

In some embodiments, quantity of random access preambles corresponding to at least one candidate value of the plurality of candidate values is used to determine the Q PRACH occasion groups.

In some embodiments, at least one PRACH occasion group corresponding to each of the plurality of candidate values is mapped in a first mapping order, and the first mapping order includes one or more of: an increment order of indexes of random access preambles, an increment order of frequency resources, and an increment order of time resources.

In some embodiments, the first information is used to determine at least one of: a respective quantity of synchronization signal blocks corresponding to each PRACH occasion of the X PRACH occasions; and quantity of random access preambles corresponding to the synchronization signal blocks corresponding to each PRACH occasion of the X PRACH occasions.

In some embodiments, each of the Q PRACH occasion groups includes a respective plurality of PRACH occasions, and at least two PRACH occasion groups of the Q PRACH occasion groups include at least one PRACH occasion different from each other, respectively.

In some embodiments, each of the Q PRACH occasion groups includes a respective plurality of PRACH occasions, the Q PRACH occasion groups correspond to a plurality of random access preambles, and random access preambles corresponding to at least two of the Q PRACH occasion groups are different from each other.

In a fifth aspect, a first node for wireless communication is provided, including: a transceiver, a memory, and a processor. The memory is configured to store programs, and the processor is configured to call the programs in the memory and to control the transceiver to receive or transmit signals, causing the first node to perform operations of the method as illustrated in the third aspect.

In a sixth aspect, a second node for wireless communication is provided, including: a transceiver, a memory, and a processor. The memory is configured to store programs, and the processor is configured to call the programs in the memory and to control the transceiver to receive or transmit signals, causing the second node to perform operations of the method as illustrated in the fourth aspect.

In a seventh aspect, a communication system is provided, including: the first node and/or the second node as illustrated above. In some embodiments, the communication system may further include other devices that interact with the first node or the second node in the technical solutions provided in the embodiments of the present disclosure.

In an eighth aspect, a computer-readable storage medium is provided. The computer-readable storage medium is configured to store computer programs, which cause a computer to perform part of or all operations of the method as illustrated in the above aspects.

In a ninth aspect, a computer program product is provided, including: a non-transitory computer-readable storage medium storing computer programs, which are executable by one or more processors to cause a computer to perform part of or all operations of the method as illustrated in the above aspects. In some embodiments, the computer program product may be a software installation package.

In a tenth aspect, a computer program is provided, which is executable by one or more processors to cause a computer to perform part of or all operations of the method as illustrated in the above aspects.

In an eleventh aspect, a chip is provided, including: a memory and at least one processor. The at least one processor is configured to call and run computer programs from the memory, in order to implement part of or all operations of the methods as illustrated in the above aspects.

In the embodiments of the present disclosure, relatively great candidate values of a plurality of candidate values are prioritized for mapping of the PRACH occasions to the PRACH occasion groups, and/or quantity of PRACH occasion groups respectively corresponding to each candidate value of the plurality of candidate values is used for the mapping of the PRACH occasions to the PRACH occasion groups. By taking the above-mentioned factors into account, it is conducive to optimization of the mapping scheme of the PRACH occasions to the PRACH occasion groups, thereby reducing or preventing generation of orphan PRACH occasions.

The technical solutions according to the embodiments of the present disclosure are conducive to reduction of waste of resources.

The technical solutions according to the embodiments of the present disclosure are conducive to optimization of allocation of resources for multiple PRACH transmission.

The technical solutions according to the embodiments of the present disclosure are conducive to improvement of performance gain of multiple PRACH transmission and to increase of coverage range.

The technical solutions according to the embodiments of the present disclosure are conducive to reduction of random access delay and to improvement of utilization efficiency of random access resources.

DETAILED DESCRIPTION OF THE EMBODIMENTS

Architecture of a Communication System

Figure 1:
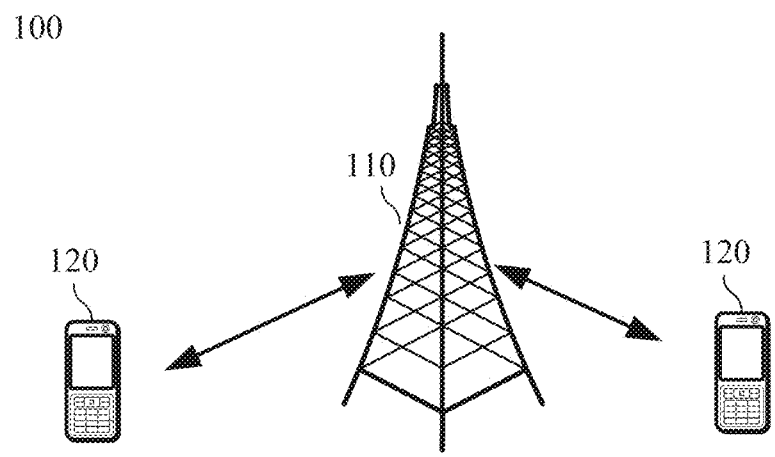
FIG. 1 is a schematic diagram of system architecture of a wireless communication system to which the embodiments of the present disclosure are applicable.

FIG. 1 is a schematic diagram of system architecture of a wireless communication system 100 to which the embodiments of the present disclosure are applicable. The wireless communication system 100 may include a network device 110 and a user equipment 120. The network device 110 may be a device implementing communication between the network device and the user equipment 120. The network device 110 can provide communication coverage for specific geographic areas, and can communicate with the user equipment 120 located within the coverage area.

FIG. 1 exemplarily illustrates one network device and two user equipment. In some embodiments, the wireless communication system 100 may include a plurality of network devices, and a coverage area of each network device may cover other quantity of user equipment, which will not be described in detail in embodiments of the present disclosure.

In some embodiments, the wireless communication system 100 may further include other network entities such as network controllers, mobile management entities, and the like, which will not be described in detail in embodiments of the present disclosure.

It shall be understood that technical solutions in the embodiments of the present disclosure may be applied to various communication systems, such as 5th generation (5G) systems or new radio (NR) systems, long term evolution (LTE) systems, frequency division duplex (FDD) systems, LTE time division duplex (TDD) systems, and the like. The technical solutions provided in the present disclosure may also be applied to future communication systems, such as sixth generation mobile communication systems, satellite communication systems, and the like.

It shall be understood that although the technical solutions in the embodiments of the present disclosure may be used for random access, they may also be used for beam failure recovery. Furthermore, the technical solutions in the embodiments of the present disclosure may be used for Type-1 random access procedure, and they also may be used for Type-2 random access procedure. Furthermore, the technical solutions in the embodiments of the present disclosure may be used for Uu interfaces, and they also may be used for PC5 interfaces. Furthermore, the technical solutions in the embodiments of the present disclosure may be used for single-carrier communication, and they also may be used for multi-carrier communication. Furthermore, the technical solutions in the embodiments of the present disclosure may be used for multi-antenna communication, and they also may be used for single-antenna communication. Furthermore, the technical solutions in the embodiments of the present disclosure may be applied to the scenario of user equipment and base station, and they are also applicable to the vehicle-to-everything (V2X) scenario, the communication scenario between user equipment and relay, and the communication scenario between relay and base station, and can achieve technical effects in similar scenario of user equipment and base station. Furthermore, the technical solutions in the embodiments of the present disclosure may be applied to various communication scenarios, such as enhanced mobile broadband (eMBB) scenarios, ultra-reliable & low-latency communication (URLLC) scenarios, massive machine type communication (mMTC) scenarios, and the like. Moreover, adopting a unified solution for different scenarios can also help reduce hardware complexity and costs.

The user equipment in the embodiments of the present disclosure may also be referred to as a terminal device, an access terminal, a subscriber unit, a subscriber station, a mobile radio station, a mobile station (MS), a mobile terminal (MT), a remote station, a remote terminal, a mobile device, a user terminal, a terminal, a device for wireless communication, a user agent, or a user device. The user equipment in the embodiments of the present disclosure may be a device providing voice and/or data connectivity to a user, and may be used for communication among people, objects, and machines, such as handheld devices and vehicle-mounted devices that have a wireless connection function. The user equipment in the embodiments of the present disclosure may be a mobile phone, a tablet computer (Pad), a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in smart grid, a wireless terminal in transportation safety, a wireless terminal in smart city, a wireless terminal in smart homes, and the like. In some embodiments, the UE may function as a base station. For example, the UE may function as a scheduling entity, which provides a sidelink signal among UEs in vehicle-to-everything (V2X) communication or device-to-device (D2D) communication, or the like. For example, a cellular phone and a vehicle communicate with each other using a sidelink signal, or a cellular phone and a smart home device communicate with each other, without relay of a communication signal through a base station.

The network device in the embodiments of the present disclosure may be a device for communicating with the user equipment. The network device may also be referred to as an access network device or a radio access network device. For example, the network device may be a base station. The network device in the embodiments of the present disclosure may refer to a radio access network (RAN) node (or device) that accesses the user equipment to a wireless network. The base station may broadly include the following various terms or be equivalent to the following terms, such as a node B (NodeB), an evolved NodeB (eNB), a next generation NodeB (gNB), a relay station, an access point, a transmitting and receiving point (TRP), a transmitting point (TP), a master eNodeB (MeNB), a secondary eNodeB (SeNB), a multi-standard radio (MSR) node, a home base station, a network controller, an access node, a wireless node, an access point (AP), a transmission node, a transceiver node, a base band unit (BBU), a remote radio unit (RRU), an active antenna unit (AAU), a remote radio head (RRH), a central unit (CU), a distributed unit (DU), a positioning node, and the like. The base station may be a macro base station, a micro base station, a relay node, a donor node, or the like, or a combination thereof. The base station may also refer to a communication module, a modem, or a chip that are provided in the above-mentioned devices or apparatuses. The base station may also be a mobile switching center, as well as a device functioning as a base station in D2D, V2X, machine to machine (M2M) communication, a network-side device in the 6G network, a device functioning as a base station in future communication systems, or the like. The base station may support networks having the same or different access technologies. The embodiments of the present disclosure are not limited to the specific technologies and the specific equipment forms of network devices.

The base station may be a fixed or mobile base station. For example, a helicopter or unmanned aerial vehicle may be configured to function as a mobile base station and one or more cells may move with the location of the mobile base station. In some other examples, the helicopter or the unmanned aerial vehicle may be configured to serve as a device for communicating with another base station.

In some deployments, the network device in the embodiments of the present disclosure may refer to CU or DU, or the network device includes both the CU and DU. The gNB may also include the AAU.

The network device and the user equipment may be deployed on land, including indoors or outdoors, handheld or vehicle-mounted, or may be deployed on the water, or may be deployed on airplanes, balloons, and satellites in the air. The scenarios in which the network device and the user equipment are deployed are not limited in the embodiments of present disclosure.

It should be understood that all or part of the functions of the communication device in the present disclosure can also be implemented by software functions running on hardware, or by virtualization functions instantiated on a platform (such as a cloud platform).

Enhanced Coverage of PRACH Transmission

The coverage performance of communication systems (such as NR systems) is an important factor that operators need to consider when deploying commercial communication networks. This is because the coverage performance of communication systems will directly influence the service quality of communication systems and the costs of the operators, such as capital expenditure (CAPEX) and operating expenses (OPEX) of operators.

The coverage performance of communication systems will vary with the frequency bands in which the communication systems operate. For example, compared to LTE systems, NR systems operate in higher frequency bands (such as millimeter wave frequency bands), resulting in greater path loss and therefore relatively poorer coverage performance of NR systems. Therefore, as the frequency bands supported by communication systems may become increasingly high, how to enhance the coverage of communication systems has become a problem that needs to be solved.

In most practical deployment scenarios, due to the weaker capabilities of user equipment compared to network devices, the coverage performance of the uplinks is the bottleneck for enhancing the coverage of communication systems. With the development of communication technology, the quantity of uplink services in some certain emerging vertical use cases is gradually increasing, such as video uploading services. In scenarios having many uplink services, how to enhance the coverage of the uplinks is a problem that needs to be further solved.

In related technologies, there have been solutions of coverage enhancement certain uplinks. For example, release 17 (Rel-17) for NR has designed coverage enhancement schemes for physical uplink shared channel (PUSCH), physical uplink control channel (PUCCH) and message 3 (Msg3) in random access processes.

However, Rel-17 did not design coverage enhancement schemes for PRACH, but the performance of PRACH transmission (also known as PRACH sending) is crucial for many processes such as initial access, beam failure recovery, and the like. Therefore, coverage enhancement for PRACH is also very important. Based on this, in the 3rd generation partnership project (3GPP) RP-221858, Rel-18, the work item (WI) of "further NR coverage enhancements" is established. In this WI, enhancing the coverage performance of PRACH transmission is one of the important topics.

As a possible implementation, multiple PRACH transmissions may be used to enhance the coverage of PRACH transmission. That is to say, coverage enhancement of PRACH transmission can be achieved by repeated transmission of PRACH (such as transmitting random access preambles for a plurality of times in PRACH). It should be noted that in the present disclosure, multiple PRACH transmission may also be replaced with terms such as a plurality of PRACH transmissions, multiple transmissions of PRACH, multiple sending of PRACH, multi-sending PRACH, repeated PRACH transmissions, type-3 random access procedure, and the like, embodiments of the present disclosure are not limited to this. That is to say, the multiple PRACH transmissions mentioned in the present disclosure may be replaced with at least one of a plurality of PRACH transmissions, multiple transmissions of PRACH, multiple sending of PRACH, multi-sending PRACH, repeated PRACH transmissions, or type-3 random access procedure.

In some embodiments, the multiple PRACH transmissions are used for a random access channel (RACH) attempt. That is to say, in a RACH attempt, a scheme of multiple PRACH transmissions may be used (such as transmitting preambles for a plurality of times on PRACH) to enhance PRACH coverage.

In the embodiments of the present disclosure, the multiple PRACH transmissions may refer to multiple PRACH transmissions using a same beam, or multiple PRACH transmissions using different beams. Taking multiple PRACH transmissions using a same beam as an example, the multiple PRACH transmissions using a same beam can obtain performance gains and can therefore be used as a feasible PRACH coverage enhancement scheme. The 3GPP radio access network (RAN) 1 #110bis-e conference has reached an agreement that PRACH occasions (or referred to as RACH occasions) at least in different time instances (or referred to as time points, temporal instances, or the like) may be used for the multiple PRACH transmissions using a same beam. In other words, ROG may be used for the multiple PRACH transmissions using a same beam.

In addition, the quantity of multiple PRACH transmissions (quantity of times of multiple PRACH transmissions/repetition factor) may also be defined, and the quantity of PRACH transmissions configured for the multiple PRACH transmissions may include a plurality of numerical values. For example, the RAN1 #110bis-e conference further defined the quantity of the multiple PRACH transmissions using a same beam, which may include at least 2, 4, and 8. That is to say, A ROG may include 2, 4, or 8 valid ROs. In other words, a ROG size may be one of 2, 4, or 8. ROG will be further illustrated below.

PRACH Occasion Group

In some scenarios, ROG is introduced to indicate a set including a plurality of PRACH occasions (PRACH occasion, RO), therefore, A ROG may also be referred to as a "RO set". The embodiments of the present disclosure do not limit the name of ROG. For ease of description, the embodiments of the present disclosure are illustrated based on ROG. The embodiments of the present disclosure do not limit the name of the PRACH occasions, for example, a PRACH occasion may also be referred to as a random access occasion, or may also be referred to as a transmission occasion, etc. For case of description, the embodiments of the present disclosure are illustrated based on the PRACH occasions, and the PRACH occasions and random access occasions mentioned in the embodiments of the present disclosure may be replaced with each other.

In some embodiments, ROG may be used for multiple PRACH transmissions using the same beam.

In some embodiments, ROG may include ROs corresponding to a plurality of PRACHs transmitted using the same beam.

In some embodiments, some conferences (such as 3GPP RAN1) have agreed to introduce ROG as a resource for multiple PRACH transmissions. A ROG may include a plurality of valid ROs, for example, a ROG may include a plurality of valid ROs that are not overlapped with each other in the time domain.

In some embodiments, it has been discussed in some conferences (such as 3GPP RAN1 #110bis-c) that ROs in different time instances may be used for multiple PRACH transmissions using the same beam. That is to say, a plurality of ROs in a ROG may be distributed in different time instances.

In some embodiments, for a specific quantity of PRACH transmissions, a ROG includes valid ROs, which helps to transmit the specific quantity of PRACHs through the valid ROs.

In some embodiments, all ROs in a ROG may be related to a same synchronization signal block (or referred to as synchronization signal/physical broadcast channel block, SS/PBCH block, SSB). For simplicity, the synchronization signal block or synchronization signal/physical broadcast channel block will be referred to as SSB, which may be replaced with SS/PBCH block at will.

In some embodiments, all ROs in a ROG may be related to an SSB. In some embodiments, all ROs in a ROG may be related to a plurality of SSBs, and each RO in the ROG is related to the same plurality of SSBs.

As mentioned above, the quantity of PRACH transmissions configured for multiple PRACH transmissions may include a plurality of numerical values. In this case, a plurality of multiple PRACH transmissions having different quantity of PRACH transmissions may be distinguished by independent ROs and/or independent preambles in shared ROs. That is to say, when the multiple PRACH transmissions are configured to have a plurality of ROG sizes, the plurality of PRACH transmissions corresponding to the different ROG sizes may be distinguished by independent ROs and/or independent preambles in shared ROs.

In some embodiments, for multiple PRACH transmissions distinguished by independent preambles in shared ROs, legacy SSB-to-RO mapping rules may be reused. In some embodiments, only ROs mapped to SSB in single PRACH transmission may be used for multiple PRACH transmissions. For example, for multiple PRACH transmissions distinguished by independent preambles in shared ROs, legacy SSB-to-RO mapping rules may be reused, and only ROs mapped to SSB in single PRACH transmission may be used for multiple PRACH transmissions.

In some embodiments, for multiple PRACH transmissions distinguished by independent ROs, new SSB-to-RO mapping rules may be introduced, or legacy SSB-to-RO mapping rules may be reused.

Then, if legacy SSB-to-RO mapping rules are reused, how to map ROs to ROG after the SSB-to-RO mapping is a problem that needs to be solved. In other words, how to determine (or configure) ROG after the SSB-to-RO mapping is a problem that needs to be addressed.

Mapping ROs to ROG may require consideration of a plurality of factors. For example, in addition to considering the configured size of ROG (or the configured quantity of PRACH transmissions for multiple PRACH transmissions), one or more of the following factors may also be considered: the quantity of frequency division multiplexed ROs in a time instance, the quantity of SSBs corresponding to each RO, and the quantity of contention-based preambles corresponding to each SSB. For case of understanding, two examples of mapping schemes of RO to ROG are provided below with reference to FIGS. 2 and 3.

Figure 2:
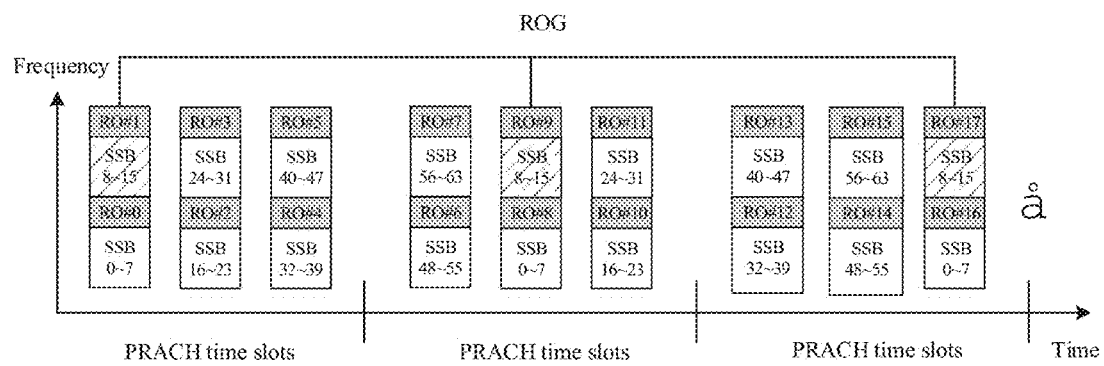
FIG. 2 is a schematic diagram of mapping of RO to ROG.

FIG. 2 shows an example of a scheme of mapping ROs to ROG. When the quantity of frequency division multiplexed ROs in a time instance is 2, and the quantity of SSBs corresponding to each RO is 8, the SSB-to-RO mapping scheme is as shown in FIG. 2, that is, RO #0 corresponds to SSBs 0-7, RO #1 corresponds to SSBs 8-15, RO #2 corresponds to SSBs 16-23, etc. In this case, considering that all ROs in the ROG are related to the same SSB and that the ROs in a ROG are in different time instances, referring to FIG. 2, RO #1, RO #9, and RO #17 may be mapped to a same ROG. For example, when the ROG size is 2, RO #1 and RO #9 may be mapped to the same ROG, and when the ROG size is 4, RO #1, RO #9, RO #17, and RO #25 (not shown in the drawings) may be mapped to the same ROG.

In some embodiments, the ROs in a determined ROG may be discontinuous. That is to say, the ROs in a ROG may be separated by one or more ROs. Taking FIG. 2 as an example, when the ROG includes RO #1 and RO #9, there is discontinuity between RO #1 and RO #9, that is, RO #1 and RO #9 are separated by RO #3, RO #5, and RO #7.

Figure 3:
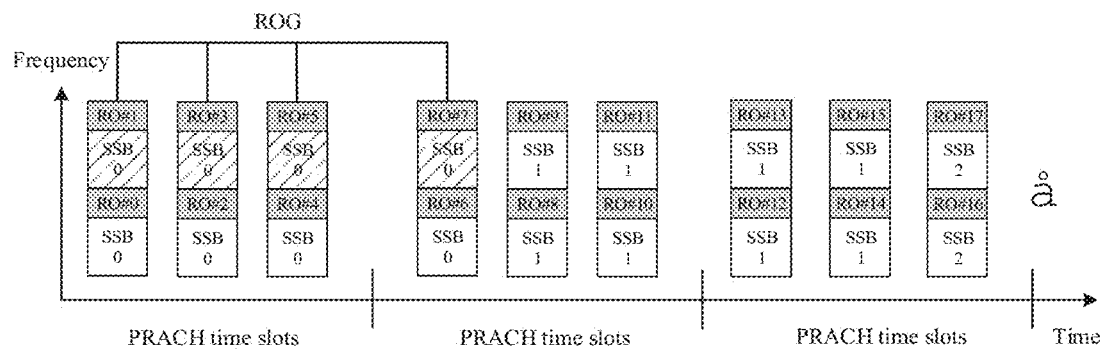
FIG. 3 is another schematic diagram of the mapping of RO to ROG.

FIG. 3 shows another example of a scheme of mapping ROs to ROG. When the quantity of frequency division multiplexed ROs in a time instance is 2, and the quantity of SSBs corresponding to each RO is ⅛, the SSB-to-RO mapping scheme is as shown in FIG. 3, that is, RO #0 to RO #7 correspond to SSB 0, RO #8 to RO #15 correspond to SSB 1, and the like. In this case, considering that all ROs in the ROG are related to the same SSB and that the ROs in a ROG are in different time instances, referring to FIG. 3, RO #1, RO #3, RO #5, and RO #7 may be mapped to a same ROG. For example, when the ROG size is 2, RO #1 and RO #3 may be mapped to the same ROG, and when the ROG size is 4, RO #1, RO #3, RO #5, and RO #7 may be mapped to the same ROG.

In some embodiments, the ROs in a determined ROG may be continuous. That is to say, there may be no other ROs between the ROs in a ROG. Taking FIG. 3 as an example, when the ROG includes RO #1, RO #3, RO #5, and RO #7, RO #1, RO #3, RO #5, and RO #7 may be continuous.

From the above description, it can be seen that any one or more of a plurality of factors may influence the mapping scheme of ROs to ROG. Therefore, it is particularly important to determine the mapping scheme of ROs to ROG. For example, considering that a ROG size may be one of three sizes: 2 ROs, 4 ROs, or 8 ROs, and that the ROs in a ROG are in different time instances, different ROG determination methods may result in orphan RO(s), which may not be able to be used for multiple PRACH transmissions, leading to resource waste. In some embodiments, the quantity of resulted orphan RO(s) may vary with different parameter configurations, resulting in varying degrees of resource waste. In addition, the mapping scheme of ROs to ROG may influence resource allocation for multiple PRACH transmissions. For case of understanding, the following will provide a more detailed description to this issue in conjunction with FIG. 4.

Figure 4:
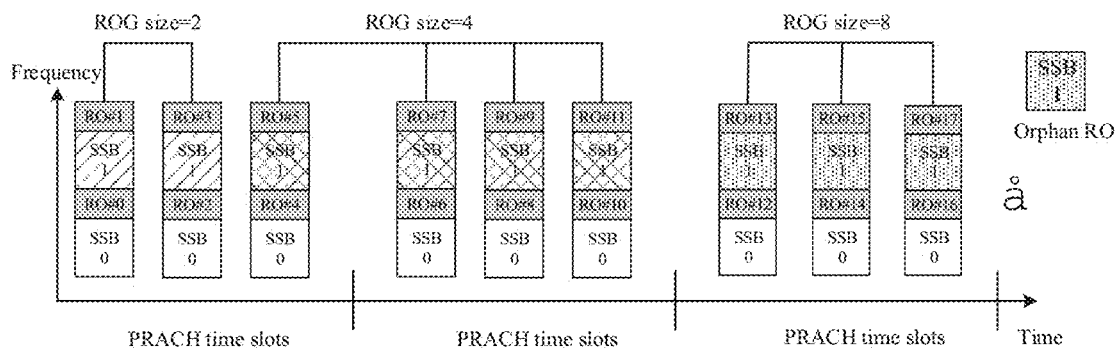
FIG. 4 is still another schematic diagram of the mapping of RO to ROG.

Referring to FIG. 4, in this example, ROs need to be mapped to ROGs with three different sizes, i.e. 2 ROs, 4 ROs, and 8 ROs, respectively. In this example, suppose a random access channel attempt corresponds to 3 PRACH time slots. From the example in FIG. 4, it can be seen that after the mapping to the ROGs with ROG sizes of 2 ROs and 4 ROs, the remaining ROs are not enough to be mapped to the ROG with a ROG size of 8 ROs. Therefore, the remaining ROs will not be mapped to the ROG with the ROG size of 8 ROs, resulting in the remaining ROs becoming orphan ROs.

For addressing the above problem, embodiments of the present disclosure provide a method and a device applicable to a node for wireless communication, which is conducive to optimization of the mapping scheme of ROs to ROGs, or to reduction or prevention of generation of orphan ROs. In this way, resource waste can be reduced. The technical solutions according to the embodiments of the present disclosure will be illustrated below.

The present disclosure is applicable to the scenario of multiple PRACH transmissions, that is, to the scenario of using a plurality of repeated PRACH transmissions to achieve enhancement of coverage of PRACH.

The present disclosure is applicable to various random access processes. In some embodiments, the present disclosure is applicable to a four-step random access process, in other words, is applicable to a type-1 random access procedure. In some embodiments, the present disclosure is applicable to a two-step random access process, in other words, is applicable to a type-2 random access procedure. In some embodiments, the present disclosure is applicable to a random access process corresponding to multiple PRACH transmissions, in other words, is applicable to a type-3 random access procedure.

The present disclosure is applicable to random access processes initiated by various initiating manners. In some embodiments, the present application is applicable to the random access processes initiated by PDCCH order. In some embodiments, the present application is applicable to the random access processes initiated by media access control (MAC) entities. In some embodiments, the present application is applicable to random access processes initiated by radio resource control (RRC) events.

In some embodiments, the multiple PRACH transmissions mentioned in the present disclosure may refer to the multiple PRACH transmissions using the same beam, in order to obtain signal-to-noise ratio (SNR) gain by repeated transmissions of a plurality of PRACHs performed on the same beam.

In some embodiments, the multiple PRACH transmissions mentioned in the present disclosure may refer to the multiple PRACH transmissions using different beams, in order to obtain diversity gain by repeated transmissions of a plurality of PRACHs performed on different beams.

In some embodiments, the present disclosure mainly considers reusing legacy SSB-to-RO mapping rules, and based on this, designs a RO-to-ROG mapping scheme (mapping rule). It should be noted that the present disclosure mainly considers but is not limited to reusing legacy SSB-to-RO mapping rules.

The methods and devices provided in the present disclosure will be illustrated below using a plurality of embodiments or examples. It should be understood that, without conflict, the features of a first node in the embodiments of the present disclosure can be applied to a second node, and vice versa. Without conflict, the features in the embodiments of the present disclosure can be arbitrarily combined with each other.

Figure 5:
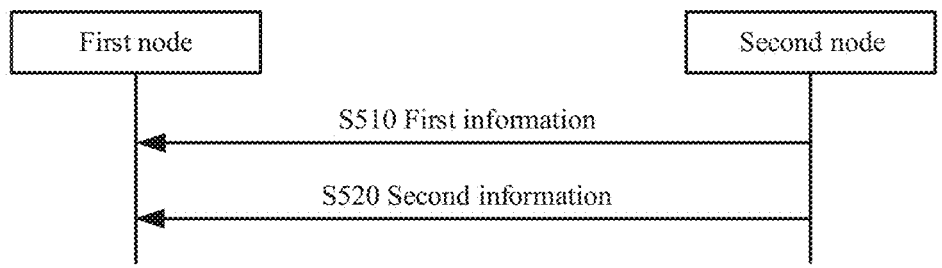
FIG. 5 is a flowchart of a method applicable to a node for wireless communication provided in some embodiments of the present disclosure.

FIG. 5 is a flowchart of the method applicable to a node for wireless communication provided in some embodiments of the present disclosure. The method as shown in FIG. 5 is illustrated from the perspective of interaction between the first and second nodes. Below is a brief illustration of the first and second nodes.

In some embodiments, the first node may be any type of node in the communication system that can perform mapping of ROs to ROG.

In some embodiments, the first node may be user equipment. For example, the first node may be the user equipment 120 as shown in FIG. 1.

In some embodiments, the first node may be a network-controlled repeater (NCR).

In some embodiments, the first node may be a relay, for example, a relay terminal.

In some embodiments, the first node may include one or more receivers. For example, the first node may include a receiver that can receive a plurality of types of information, signaling, or data. Alternatively, the first node may include a plurality of receivers that can receive different information, signaling, or data, respectively.

In some embodiments, the first node may include a first receiver and a second receiver.

In some embodiments, the first node may include a transmitter. For example, the first node may further include a first transmitter.

In some embodiments, the second node may be a node in the communication system configured to transmit first and/or second information.

In some embodiments, the second node may be a base station.

In some embodiments, the second node may be a NCR.

In some embodiments, the second node may be a relay, for example, a relay terminal.

In some embodiments, the second node may include one or more transmitters. For example, the second node may include a second transmitter and a third transmitter.

In some embodiments, the second node may include a fourth transmitter.

The method as shown in FIG. 5 will be illustrated below. Refer to FIG. 5, the method as shown in FIG. 5 may include operations S510 and S520.

At S510, the first node receives first information.

In some embodiments, the first information is used to determine X PRACH occasions, and X is a positive integer greater than 1. In other words, the first information is used to determine a plurality of PRACH occasions.

In some embodiments, the first information is used to indicate X PRACH occasions.

The implementation of determining the X PRACH occasions using the first information is not specified in the embodiments of the present disclosure. In some embodiments, the first information is used to determine at least one of: a respective quantity of synchronization signal blocks corresponding to each PRACH occasion of the X PRACH occasions; and quantity of random access preambles corresponding to the synchronization signal blocks corresponding to each PRACH occasion of the X PRACH occasions.

In some embodiments, the first information is used to determine a respective quantity of synchronization signal blocks corresponding to each PRACH occasion of the X PRACH occasions.

In some embodiments, the first information is used to determine quantity of random access preambles corresponding to the synchronization signal blocks corresponding to each PRACH occasion of the X PRACH occasions.

In some embodiments, the first information is used to determine a respective quantity of synchronization signal blocks corresponding to each PRACH occasion of the X PRACH occasions and quantity of random access preambles corresponding to each synchronization signal block.

In some embodiments, the quantity of random access preambles corresponding to the synchronization signal blocks may include: the quantity of contention-based random access preambles corresponding to the synchronization signal blocks. For example, the first information may be used to determine: the quantity of contention-based random access preambles corresponding to the synchronization signal blocks corresponding to each PRACH occasion.

The content of the first information is not specified in the embodiments of the present disclosure. In some embodiments, the first information may indicate the quantity of the synchronization signal blocks corresponding to each PRACH occasion of the X PRACH occasions. For example, a parameter ssb-perRACH-Occasion is used to indicate the quantity of the synchronization signal blocks corresponding to each PRACH occasion of the X PRACH occasions. In some other embodiments, the first information may indicate the quantity of the synchronization signal blocks corresponding to each PRACH occasion of the X PRACH occasions, the quantity of random access preambles corresponding to each synchronization signal block, and the like. For example, a parameter CB-PreamblesPerSSB is used to indicate the quantity of random access preambles corresponding to each synchronization signal block.

In some embodiments, the first information may include transmission parameters for configuring synchronization signal blocks in a communication network (such as a 5G network). For example, the first information may be a parameter ssb-perRACH-OccasionAndCB-PreamblesPerSSB.

In some embodiments, the relevant introduction of the parameter ssb-perRACH-OccasionAndCB-PreamblesPerSSB may be found in the introduction of 3GPP TS38.331.

In some embodiments, the first information is received by the first node through the first receiver.

In some embodiments, the first information is transmitted by the second node to the first node. For example, the first information is transmitted by a network device or other nodes to the first node.

In some embodiments, the first information is transmitted through high-level signaling or higher-level signaling. For example, the first information is transmitted through RRC-layer signaling or MAC-layer signaling.

In some embodiments, the first information is used, by the first node, to determine the X PRACH occasions In some embodiments, the X PRACH occasions are mapped to Q PRACH occasion groups, and Q is a positive integer. In other words, the X PRACH occasions are mapped to one or more PRACH occasion groups. That is to say, in the embodiments of the present disclosure, a plurality of PRACH occasions may be mapped to one or more PRACH occasion groups.

In some embodiments, the X PRACH occasions are mapped, by the first node, to the Q PRACH occasion groups.

In some embodiments, the X PRACH occasions are mapped, by the second node, to the Q PRACH occasion groups.

In some embodiments, each of the Q PRACH occasion groups includes at least one PRACH occasion. In other words, each of the Q PRACH occasion groups includes at least one PRACH occasion.

In some embodiments, each of the Q PRACH occasion groups includes a plurality of PRACH occasions.

In some embodiments, each of the Q PRACH occasion groups includes at least one PRACH occasion of the X PRACH occasions.

In some embodiments, one respective PRACH occasion group of the Q PRACH occasion groups includes a corresponding PRACH occasion of the X PRACH occasions. The one respective PRACH occasion group may be any one of the Q PRACH occasion groups. The corresponding PRACH occasion may be any one of the X PRACH occasions.

In some embodiments, one respective PRACH occasion group of the Q PRACH occasion groups includes a corresponding plurality of PRACH occasions of the X PRACH occasions. The one respective PRACH occasion group may be any one of the Q PRACH occasion groups. The corresponding plurality of PRACH occasions may be any plurality of PRACH occasions of the X PRACH occasions.

In some embodiments, the respective plurality of PRACH occasions in each of the Q PRACH occasion groups are orthogonal to each other in the time domain. In other words, the plurality of PRACH occasions in each of the Q PRACH occasion groups are not overlapped with each other in the time domain. In other words, the plurality of PRACH occasions in each of the Q PRACH occasion groups are time-division multiplexed (TDM).

In some embodiments, the plurality of PRACH occasions being orthogonal to each other in the time domain may refer to that any two of the plurality of PRACH occasions are distributed at time instances different from each other.

In some embodiments, each of the Q PRACH occasion groups includes a respective plurality of PRACH occasions, and at least two PRACH occasion groups of the Q PRACH occasion groups include at least one PRACH occasion different from each other, respectively.

In some embodiments, each of the Q PRACH occasion groups includes a respective plurality of PRACH occasions, the Q PRACH occasion groups correspond to a plurality of random access preambles, and random access preambles corresponding to at least two of the Q PRACH occasion groups are different from each other.

In some embodiments, the respective plurality of PRACH occasions in each of the Q PRACH occasion groups are related to a same synchronization signal block. In other words, the respective plurality of PRACH occasions in each of the Q PRACH occasion groups are related to an identical synchronization signal block.

In some embodiments, the respective plurality of PRACH occasions in each of the Q PRACH occasion groups are orthogonal to each other in the time domain and are related to a same synchronization signal block.

In some embodiments, at least two PRACH occasion groups of the Q PRACH occasion groups include different quantity of PRACH occasions, respectively. For example, the Q PRACH occasion groups include a first PRACH occasion group and a second PRACH occasion group, and quantity of the PRACH occasions in the first PRACH occasion group is different from quantity of the PRACH occasions in the second PRACH occasion group.

In some embodiments, at least two PRACH occasion groups of the Q PRACH occasion groups include same quantity of PRACH occasions, respectively. For example, the Q PRACH occasion groups include a first PRACH occasion group and a second PRACH occasion group, and quantity of the PRACH occasions in the first PRACH occasion group is the same as quantity of the PRACH occasions in the second PRACH occasion group.

In some embodiments, some PRACH occasion groups of the Q PRACH occasion groups include same quantity of PRACH occasions, respectively.

In some embodiments, some PRACH occasion groups of the Q PRACH occasion groups include different quantity of PRACH occasions, respectively.

In some embodiments, each PRACH occasion of the X PRACH occasions is mapped to a respective PRACH occasion group of the Q PRACH occasion groups. That is to say, after the mapping of the X PRACH occasions to the Q PRACH occasion groups, no orphan PRACH occasion is generated. In other words, after the mapping of the X PRACH occasions to the Q PRACH occasion groups, all of the X PRACH occasions can be used for the multiple PRACH transmissions.

In some embodiments, at least one PRACH occasion of the X PRACH occasions is mapped to a corresponding PRACH occasion group of the Q PRACH occasion groups.

In some embodiments, at least one PRACH occasion of the X PRACH occasions is not mapped to any one of the Q PRACH occasion groups. That is to say, after the mapping of the X PRACH occasions to the Q PRACH occasion groups, orphan PRACH occasions are generated. In other words, after the mapping of the X PRACH occasions to the Q PRACH occasion groups, the PRACH occasions of the X PRACH occasions that are not mapped to any one of the Q PRACH occasion groups cannot be used for the multiple PRACH transmissions.

In some embodiments, the Q PRACH occasion groups can be used for the multiple PRACH transmissions. For example, the Q PRACH occasion groups can be used, by the first node, for the multiple PRACH transmissions.

In some embodiments, the PRACH occasions in each of the Q PRACH occasion groups can be used for the multiple PRACH transmissions. In other words, the multiple PRACH transmissions may be performed on the PRACH occasions in each of the Q PRACH occasion groups.

In some embodiments, the multiple PRACH transmissions correspond to a random access channel attempt.

In some embodiments, the multiple PRACH transmissions are used for a random access channel attempt.

In some embodiments, the multiple PRACH transmissions include transmissions of a plurality of random access preambles on a random access channel attempt.

In some embodiments, the plurality of PRACH occasions in each of the Q PRACH occasion groups may be used to transmit a plurality of random access preambles.

At S520, the first node receives second information.

In some embodiments, the second information is used to determine a plurality of candidate values.

In some embodiments, the second information is used to indicate a plurality of candidate values.

In some embodiments, the plurality of candidate values may include or be replaced with at least one of: a plurality of ROG sizes, or the plurality of candidate values for the quantity of PRACHs in the multiple PRACH transmissions. That is to say, in some embodiments, the second information is used to determine (or indicate) a plurality of ROG sizes, or the second information is used to determine (or indicate) the plurality of candidate values for the quantity of PRACHs in the multiple PRACH transmissions.

In some embodiments, the second information is received by the first node through the second receiver.

In some embodiments, the second information is transmitted by the second node to the first node. For example, the second information is transmitted by a network device or other nodes to the first node.

In some embodiments, the second information is transmitted through a physical layer (PHY), high-level signaling or higher-level signaling. For example, the second information is transmitted through PHY signaling, RRC-layer signaling or MAC-layer signaling.

In some embodiments, the PHY signaling may include or be replaced with at least one of: downlink control information (DCI), physical broadcast channel (PBCH), demodulation reference signal (DMRS).

In some embodiments, the second information is used by the first node to determine the plurality of candidate values.

In some embodiments, each of the plurality of candidate values is a respective positive integer.

In some embodiments, each of the plurality of candidate values is one of {2, 4, 8}.

In some embodiments, each of the plurality of candidate values is one of {1, 2, 4, 8}.

In some embodiments, any two of the plurality of candidate values are different from each other.

In some embodiments, the plurality of candidate values include at least two of {2, 4, 8}. For example, the plurality of candidate values include {2, 4}; or the plurality of candidate values include {2, 8}; or the plurality of candidate values include {4,8}; or the plurality of candidate values include {2, 4, 8}.

In some embodiments, the plurality of candidate values include at least two of {1, 2, 4, 8}. For example, the plurality of candidate values include {1, 2}; or the plurality of candidate values include {1,4}; or the plurality of candidate values include {1, 2, 4}; or the plurality of candidate values include {1, 2, 8}; or the plurality of candidate values include {1, 2, 4, 8}, and the like.

In some embodiments, a first candidate value is the maximum value of the plurality of candidate values, or the first candidate value is the largest ROG size of the plurality of ROG sizes.

As an example, when the plurality of candidate values include 2 and 4, the first candidate value is 4. As another example, when the plurality of candidate values include 2 and 8, the first candidate value is 8. As another example, when the plurality of candidate values include 4 and 8, the first candidate value is 8. As another example, when the plurality of candidate values include 2, 4, and 8, the first candidate value is 8.

In some embodiments, quantity of PRACH occasions in each of the Q PRACH occasion groups is a corresponding candidate value of the plurality of candidate values. Taking the plurality of candidate values including at least two of {1, 2, 4, 8} as an example, when the plurality of candidate values include {2, 4}, the quantity of PRACH occasions in each of the Q PRACH occasion groups is one of {2, 4}, when the plurality of candidate values include {2, 4, 8}, the quantity of PRACH occasions in each of the Q PRACH occasion groups is one of {2, 4, 8}, and so on.

In some embodiments, the quantity of PRACH occasions in a PRACH occasion group corresponding to one respective candidate value of the plurality of candidate values is equal to the one respective candidate value. In other words, the quantity of PRACH occasions in each PRACH occasion group of at least one PRACH occasion group corresponding to one respective candidate value of the plurality of candidate values is equal to the one respective candidate value.

In some embodiments, the first candidate value is one respective candidate value of the plurality of candidate values, and the quantity of PRACH occasions in a PRACH occasion group corresponding to the first candidate value is (equal to) the first candidate value.

In some embodiments, the first candidate value is one respective candidate value of the plurality of candidate values, the first candidate value corresponds to one PRACH occasion group, and the quantity of PRACH occasions in the one PRACH occasion group corresponding to the first candidate value is equal to the first candidate value.

In some embodiments, the first candidate value is one respective candidate value of the plurality of candidate values, the first candidate value corresponds to a plurality of PRACH occasion groups, and the quantity of PRACH occasions in one respective PRACH occasion group of the plurality of PRACH occasion groups corresponding to the first candidate value is equal to the first candidate value.

In some embodiments, the first candidate value is one respective candidate value of the plurality of candidate values, the first candidate value corresponds to at least one PRACH occasion group, and the quantity of PRACH occasions in one respective PRACH occasion group of the at least one PRACH occasion group corresponding to the first candidate value is equal to the first candidate value.

The performing order of the operations S510 and S520 is not specified in the embodiments of the present disclosure. For example, the operation S510 may be performed before the operation S520, after the operation S520, or simultaneously with the operation S520.

In the embodiments of the present disclosure, the mapping of the X PRACH occasions to the Q PRACH occasion groups may be related to a plurality of factors (parameters), for example with one or more of: the plurality of candidate values, quantity of PRACH occasion groups respectively corresponding to each candidate value of the plurality of candidate values, and the like.

In some embodiments, the plurality of candidate values include a first candidate value and a second candidate value, and a greater one of the first candidate value and the second candidate value is prioritized for mapping of the X PRACH occasions to the Q PRACH occasion groups; and/or the mapping of the X PRACH occasions to the Q PRACH occasion groups is related to quantity of PRACH occasion groups respectively corresponding to each candidate value of the plurality of candidate values.

In some embodiments, a greater one of the first candidate value and the second candidate value is prioritized for the mapping of the X PRACH occasions to the Q PRACH occasion groups. In other words, determination of the PRACH occasion group corresponding to the greater one of the first candidate value and the second candidate value is prioritized.

In some embodiments, the first candidate value and second candidate value represent different ROG sizes, respectively. The mapping of the X PRACH occasions to a PRACH occasion group having a greater ROG size or determination of the PRACH occasion group having the greater ROG size is prioritized.

As an example, the first candidate value is 2, the second candidate value is 4, and the candidate value 4 is prioritized for the mapping of the X PRACH occasions to the Q PRACH occasion groups. In other words, determination of the PRACH occasion group corresponding to the candidate value 4 is prioritized. In other words, the mapping of the X PRACH occasions to the PRACH occasion group having a ROG size of 4 is prioritized. In other words, determination of the PRACH occasion group having the ROG size of 4 is prioritized.

In some embodiments, a greater one of the plurality of candidate values is prioritized for the mapping of the X PRACH occasions to the Q PRACH occasion groups. In other words, determination of the PRACH occasion group corresponding to the greater one of the plurality of candidate values is prioritized.

As an example, the plurality of candidate values include {4, 8}, and the candidate value 8 is prioritized for the mapping of the X PRACH occasions to the Q PRACH occasion groups. In other words, determination of the PRACH occasion group corresponding to the candidate value 8 is prioritized. In other words, the mapping of the X PRACH occasions to the PRACH occasion group having a ROG size of 8 is prioritized. In other words, determination of the PRACH occasion group having the ROG size of 8 is prioritized.

As another example, the plurality of candidate values include {2, 4, 8}. Compared with the mapping of the X PRACH occasions to the PRACH occasion group corresponding to the candidate value 2, the mapping of the X PRACH occasions to the PRACH occasion group corresponding to the candidate value 4 and/or 8 has a higher priority, and compared with the mapping of the X PRACH occasions to the PRACH occasion group corresponding to the candidate value 4, the mapping of the X PRACH occasions to the PRACH occasion group corresponding to the candidate value 8 has a higher priority. In other words, compared with the mapping of the X PRACH occasions to the PRACH occasion group having a ROG size of 2, the mapping of the X PRACH occasions to the PRACH occasion group having a ROG size of 4 and/or 8 has a higher priority, and compared with the mapping of the X PRACH occasions to the PRACH occasion group having a ROG size of 4, the mapping of the X PRACH occasions to the PRACH occasion group having a ROG size of 8 has a higher priority.

In some embodiments, the plurality of candidate values are used, in a descending order, for the mapping of the X PRACH occasions to the Q PRACH occasion groups.

In some embodiments, the Q PRACH occasion groups are determined in the descending order of the plurality of candidate values.

In some embodiments, when the communication system is configured with a plurality of ROG sizes, the plurality of ROG sizes are used, in a descending order, for the mapping of the X PRACH occasions to the Q PRACH occasion groups.

In some embodiments, when the communication system is configured with a plurality of ROG sizes, the Q PRACH occasion groups are determined in the descending order of the plurality of ROG sizes.

As an example, the plurality of candidate values include {2, 4, 8}. The candidate value 8 is prioritized for the mapping of the X PRACH occasions to the Q PRACH occasion groups, then the candidate value 4 is used for the mapping of the X PRACH occasions to the Q PRACH occasion groups, and at last the candidate value 2 is used for the mapping of the X PRACH occasions to the Q PRACH occasion groups. In other words, the plurality of candidate values include {2, 4, 8}, the mapping of the X PRACH occasions to the PRACH occasion group having a ROG size of 8 is prioritized, then the mapping of the X PRACH occasions to the PRACH occasion group having a ROG size of 4 is performed, and at last the mapping of the X PRACH occasions to the PRACH occasion group having a ROG size of 2 is performed. In other words, the plurality of candidate values include {2, 4, 8}, determination of the PRACH occasion group having a ROG size of 8 is prioritized, then the PRACH occasion group having a ROG size of 4 is determined, and at last the PRACH occasion group having a ROG size of 2 is determined.

As another example, the plurality of candidate values include {1, 2, 4}. The candidate value 4 is prioritized for the mapping of the X PRACH occasions to the Q PRACH occasion groups, then the candidate value 2 is used for the mapping of the X PRACH occasions to the Q PRACH occasion groups, and at last the candidate value 1 is used for the mapping of the X PRACH occasions to the Q PRACH occasion groups. In other words, the plurality of candidate values include {1, 2, 4}, the mapping of the X PRACH occasions to the PRACH occasion group having a ROG size of 4 is prioritized, then the mapping of the X PRACH occasions to the PRACH occasion group having a ROG size of 2 is performed, and at last the mapping of the X PRACH occasions to the PRACH occasion group having a ROG size of 1 is performed. In other words, the plurality of candidate values include {1, 2, 4}, determination of the PRACH occasion group having a ROG size of 4 is prioritized, then the PRACH occasion group having a ROG size of 2 is determined, and at last the PRACH occasion group having a ROG size of 1 is determined.

In some embodiments, a maximum value of the plurality of candidate values is prioritized for the mapping of the X PRACH occasions to the Q PRACH occasion groups. In other words, determination of the PRACH occasion group corresponding to the maximum value of the plurality of candidate values is prioritized.

In some embodiments, when the plurality of candidate values represent various ROG sizes, the mapping of the X PRACH occasions to the PRACH occasion group having the greatest ROG size is prioritized, or determination of the PRACH occasion group having the greatest ROG size is prioritized.

As an example, when the plurality of candidate values include {2, 4, 8}, the candidate value 8 is prioritized for the mapping of the X PRACH occasions to the Q PRACH occasion groups, or determination of the PRACH occasion group corresponding to the candidate value 8 is prioritized, or the mapping of the X PRACH occasions to the PRACH occasion group having the ROG size of 8 is prioritized, or determination of the PRACH occasion group having the ROG size of 8 is prioritized.

As another example, when the plurality of candidate values include {1, 2, 4}, the candidate value 4 is prioritized for the mapping of the X PRACH occasions to the Q PRACH occasion groups, or determination of the PRACH occasion group corresponding to the candidate value 4 is prioritized, or the mapping of the X PRACH occasions to the PRACH occasion group having the ROG size of 4 is prioritized, or determination of the PRACH occasion group having the ROG size of 4 is prioritized.

Due to the fact that greater candidate values (greater sizes of ROGs) require more PRACH occasions that are not overlapped with each other in the time domain, the requirements for the PRACH occasions are stricter. Therefore, when mapping PRACH occasions to PRACH occasion groups, the mapping corresponding to greater candidate values is prioritized, and then the mapping corresponding to relatively small candidate values is performed. In this way, orphan PRACH occasions can be minimized, and utilization efficiency of resources can be improved. In other words, when mapping PRACH occasions to PRACH occasion groups, the mapping corresponding to greater ROG sizes is prioritized, and then the mapping corresponding to relatively small ROG sizes is performed. In this way, orphan PRACH occasions can be minimized, and utilization efficiency of resources can be improved.

In some embodiments, the mapping of the X PRACH occasions to the Q PRACH occasion groups is related to quantity of PRACH occasion groups respectively corresponding to each candidate value of the plurality of candidate values.

In some embodiments, the plurality of candidate values include the first candidate value and the second candidate value, and the mapping of the X PRACH occasions to the Q PRACH occasion groups is related to quantity of PRACH occasion groups corresponding to the first candidate value and quantity of PRACH occasion groups corresponding to the second candidate value.

In some embodiments, the plurality of candidate values include the first candidate value, the second candidate value and a third candidate value, and the mapping of the X PRACH occasions to the Q PRACH occasion groups is related to quantity of PRACH occasion groups corresponding to the first candidate value, quantity of PRACH occasion groups corresponding to the second candidate value and quantity of PRACH occasion groups corresponding to the third candidate value.

The embodiments of the present disclosure are not limited to this, the plurality of candidate values may include three or more candidate values, and the mapping of the X PRACH occasions to the Q PRACH occasion groups is related to quantity of PRACH occasion groups respectively corresponding to each candidate value of the plurality of candidate values.

In some embodiments, the mapping of the X PRACH occasions to the Q PRACH occasion groups is related to a respective quantity of PRACH occasion groups having each ROG size of a plurality of ROG sizes.

In some embodiments, the plurality of ROG sizes include a first ROG size and a second ROG size, and the mapping of the X PRACH occasions to the Q PRACH occasion groups is related to quantity of PRACH occasion groups having the first ROG size and quantity of PRACH occasion groups having the second ROG size.

In some embodiments, the plurality of ROG sizes include the first ROG size, the second ROG size and a third ROG size, and the mapping of the X PRACH occasions to the Q PRACH occasion groups is related to quantity of PRACH occasion groups having the first ROG size, quantity of PRACH occasion groups having the second ROG size and quantity of PRACH occasion groups having the third ROG size.

The embodiments of the present disclosure are not limited to this, the plurality of ROG sizes may include three or more ROG sizes, and the mapping of the X PRACH occasions to the Q PRACH occasion groups is related to a respective quantity of PRACH occasion groups having each ROG size of the plurality of ROG sizes.

As an example, the plurality of candidate values include {2, 4}, and the mapping of the X PRACH occasions to the Q PRACH occasion groups is related to quantity of PRACH occasion groups corresponding to the candidate value 2 and quantity of PRACH occasion groups corresponding to the candidate value 4. In other words, the mapping of the X PRACH occasions to the Q PRACH occasion groups is related to quantity of PRACH occasion groups having a ROG size of 2 and quantity of PRACH occasion groups having a ROG size of 4.

As another example, the plurality of candidate values include {2, 4, 8}, and the mapping of the X PRACH occasions to the Q PRACH occasion groups is related to quantity of PRACH occasion groups corresponding to the candidate value 2, quantity of PRACH occasion groups corresponding to the candidate value 4, and quantity of PRACH occasion groups corresponding to the candidate value 8. In other words, the mapping of the X PRACH occasions to the Q PRACH occasion groups is related to quantity of PRACH occasion groups having a ROG size of 2, quantity of PRACH occasion groups having a ROG size of 4, and quantity of PRACH occasion groups having a ROG size of 8.

In some embodiments, each occasion group sub-set of a plurality of PRACH occasion group sub-sets includes Q1 respective PRACH occasion groups of the Q PRACH occasion groups. In other words, in some embodiments, the Q PRACH occasion groups may be divided into a plurality of PRACH occasion group sub-sets, and each occasion group sub-set of the plurality of PRACH occasion group sub-sets includes at least one respective PRACH occasion groups of the Q PRACH occasion groups.

In some embodiments, each of the plurality of candidate values corresponds to at least one respective PRACH occasion group of the Q1 respective PRACH occasion groups in each occasion group sub-set of the plurality of PRACH occasion group sub-sets. In other words, for one respective occasion group sub-set of the plurality of PRACH occasion group sub-sets, each of the plurality of candidate values corresponds to at least one respective PRACH occasion group in the one respective occasion group sub-set.

In some embodiments, each occasion group sub-set of the plurality of PRACH occasion group sub-sets includes Q1 respective PRACH occasion groups of the Q PRACH occasion groups, each of the plurality of candidate values corresponds to at least one respective PRACH occasion group of the Q1 respective PRACH occasion groups in each occasion group sub-set of the plurality of PRACH occasion group sub-sets, and any two occasion group sub-sets of the plurality of PRACH occasion group sub-sets corresponding to any one of the plurality of candidate values have same quantity of PRACH occasion groups.

In some embodiments, the plurality of candidate values include the first candidate value and the second candidate value, and the plurality of PRACH occasion group sub-sets include a first occasion group sub-set and a second occasion group sub-set. For the first occasion group sub-set, the first candidate value corresponds to at least one PRACH occasion group of the Q1 PRACH occasion groups in the first occasion group sub-set, and the second candidate value corresponds to at least one PRACH occasion group of the Q1 PRACH occasion groups in the first occasion group sub-set. For the second occasion group sub-set, the first candidate value corresponds to at least one PRACH occasion group of the Q1 PRACH occasion groups in the second occasion group sub-set, and the second candidate value corresponds to at least one PRACH occasion group of the Q1 PRACH occasion groups in the second occasion group sub-set.

In some embodiments, the plurality of candidate values include the first candidate value, the second candidate value and the third candidate value, and the plurality of PRACH occasion group sub-sets include a first occasion group sub-set and a second occasion group sub-set. For the first occasion group sub-set, the first candidate value corresponds to at least one PRACH occasion group of the Q1 PRACH occasion groups in the first occasion group sub-set, the second candidate value corresponds to at least one PRACH occasion group of the Q1 PRACH occasion groups in the first occasion group sub-set, and the third candidate value corresponds to at least one PRACH occasion group of the Q1 PRACH occasion groups in the first occasion group sub-set. For the second occasion group sub-set, the first candidate value corresponds to at least one PRACH occasion group of the Q1 PRACH occasion groups in the second occasion group sub-set, the second candidate value corresponds to at least one PRACH occasion group of the Q1 PRACH occasion groups in the second occasion group sub-set, and the third candidate value corresponds to at least one PRACH occasion group of the Q1 PRACH occasion groups in the second occasion group sub-set.

In some embodiments, at least two occasion group sub-sets of the plurality of PRACH occasion group sub-sets corresponding to any one of the plurality of candidate values have same quantity of PRACH occasion groups.

As an example, the plurality of candidate values include {2, 4}, and the plurality of PRACH occasion group sub-sets include the first occasion group sub-set, the second occasion group sub-set and a third occasion group sub-set. Quantity of the PRACH occasion groups corresponding to the candidate value 2 in the first occasion group sub-set is equal to quantity of the PRACH occasion groups corresponding to the candidate value 2 in the second occasion group sub-set, and is not equal to quantity of the PRACH occasion groups corresponding to the candidate value 2 in the third occasion group sub-set. Alternatively, the quantity of the PRACH occasion groups corresponding to the candidate value 2 in the first occasion group sub-set is equal to the quantity of the PRACH occasion groups corresponding to the candidate value 2 in the second occasion group sub-set, and to the quantity of the PRACH occasion groups corresponding to the candidate value 2 in the third occasion group sub-set.

In some embodiments, each occasion group sub-set of part of the plurality of PRACH occasion group sub-sets corresponding to any one of the plurality of candidate values has a different quantity of PRACH occasion groups from quantity of PRACH occasion groups in remaining occasion group sub-sets of the part of the plurality of PRACH occasion group sub-sets.

In some embodiments, any two occasion group sub-sets of the plurality of PRACH occasion group sub-sets corresponding to any one of the plurality of candidate values have same quantity of PRACH occasion groups.

In some embodiments, the first occasion group sub-set and the second occasion group sub-set are two occasion group sub-sets of the plurality of PRACH occasion group sub-sets, quantity of the PRACH occasion groups in the first occasion group sub-set corresponding to the first candidate value is equal to quantity of the PRACH occasion groups in the second occasion group sub-set corresponding to the first candidate value, and quantity of the PRACH occasion groups in the first occasion group sub-set corresponding to the second candidate value is equal to quantity of the PRACH occasion groups in the second occasion group sub-set corresponding to the second candidate value.

As an example, the plurality of candidate values include {2, 4}, and the plurality of PRACH occasion group sub-sets include the first occasion group sub-set and the second occasion group sub-set. Quantity of the PRACH occasion groups in the first occasion group sub-set corresponding to the candidate value 2 is equal to quantity of the PRACH occasion groups in the second occasion group sub-set corresponding to the candidate value 2, and quantity of the PRACH occasion groups in the first occasion group sub-set corresponding to the candidate value 4 is equal to quantity of the PRACH occasion groups in the second occasion group sub-set corresponding to the candidate value 4.

As another example, the plurality of candidate values include {2, 4}, and the plurality of PRACH occasion group sub-sets include the first occasion group sub-set, the second occasion group sub-set and the third occasion group sub-set. Quantity of the PRACH occasion groups in the first occasion group sub-set corresponding to the candidate value 2 is equal to quantity of the PRACH occasion groups in the second occasion group sub-set corresponding to the candidate value 2, and to quantity of the PRACH occasion groups in the third occasion group sub-set corresponding to the candidate value 2. Quantity of the PRACH occasion groups in the first occasion group sub-set corresponding to the candidate value 4 is equal to quantity of the PRACH occasion groups in the second occasion group sub-set corresponding to the candidate value 4, and to quantity of the PRACH occasion groups in the third occasion group sub-set corresponding to the candidate value 4.

As still another example, the plurality of candidate values include {2, 4, 8}, and the plurality of PRACH occasion group sub-sets include the first occasion group sub-set, the second occasion group sub-set and the third occasion group sub-set. Quantity of the PRACH occasion groups in the first occasion group sub-set corresponding to the candidate value 2 is equal to quantity of the PRACH occasion groups in the second occasion group sub-set corresponding to the candidate value 2, and to quantity of the PRACH occasion groups in the third occasion group sub-set corresponding to the candidate value 2. Quantity of the PRACH occasion groups in the first occasion group sub-set corresponding to the candidate value 4 is equal to quantity of the PRACH occasion groups in the second occasion group sub-set corresponding to the candidate value 4, and to quantity of the PRACH occasion groups in the third occasion group sub-set corresponding to the candidate value 4. Quantity of the PRACH occasion groups in the first occasion group sub-set corresponding to the candidate value 8 is equal to quantity of the PRACH occasion groups in the second occasion group sub-set corresponding to the candidate value 8, and to quantity of the PRACH occasion groups in the third occasion group sub-set corresponding to the candidate value 8.

In some embodiments, at least two occasion group sub-sets of the plurality of PRACH occasion group sub-sets have same quantity of PRACH occasion groups.

In some embodiments, any two occasion group sub-sets of the plurality of PRACH occasion group sub-sets have same quantity of PRACH occasion groups.

In some embodiments, the plurality of PRACH occasion group sub-sets include the first occasion group sub-set and the second occasion group sub-set, and quantity of the PRACH occasion groups in the first occasion group sub-set is equal to quantity of the PRACH occasion groups in the second occasion group sub-set.

In some embodiments, the plurality of PRACH occasion group sub-sets include the first occasion group sub-set, the second occasion group sub-set and the third occasion group sub-set, and quantity of the PRACH occasion groups in the first occasion group sub-set is equal to quantity of the PRACH occasion groups in the second occasion group sub-set, and to quantity of the PRACH occasion groups in the third occasion group sub-set.

In some embodiments, quantity of the at least one respective PRACH occasion group in each occasion group sub-set of the plurality of PRACH occasion group sub-sets corresponding to one respective candidate value of the plurality of candidate values corresponds to a value, and values corresponding to the plurality of candidate values are in a first proportion.

In some embodiments, the plurality of candidate values include the first candidate value and the second candidate value, and a ratio of quantity of the PRACH occasion groups in each occasion group sub-set of the plurality of PRACH occasion group sub-sets corresponding to the first candidate value to quantity of the PRACH occasion groups in each occasion group sub-set of the plurality of PRACH occasion group sub-sets corresponding to the second candidate value is the first proportion.

In some embodiments, the plurality of candidate values include the first candidate value and the second candidate value, and the plurality of PRACH occasion group sub-sets include the first occasion group sub-set and the second occasion group sub-set. A ratio of quantity of the PRACH occasion groups in the first occasion group sub-set corresponding to the first candidate value to quantity of the PRACH occasion groups in the first occasion group sub-set corresponding to the second candidate value is the first proportion. A ratio of quantity of the PRACH occasion groups in the second occasion group sub-set corresponding to the first candidate value to quantity of the PRACH occasion groups in the second occasion group sub-set corresponding to the second candidate value is the first proportion.

As an example, quantity of the PRACH occasion groups in each occasion group sub-set of the plurality of PRACH occasion group sub-sets corresponding to the first candidate value is A, quantity of the PRACH occasion groups in each occasion group sub-set of the plurality of PRACH occasion group sub-sets corresponding to the second candidate value is B, and the first proportion may be represented as A: B.

As an example, quantity of the PRACH occasion groups in the first occasion group sub-set corresponding to the first candidate value is A1, quantity of the PRACH occasion groups in the first occasion group sub-set corresponding to the second candidate value is B1, and the first proportion may be represented as A1:B1. Quantity of the PRACH occasion groups in the second occasion group sub-set corresponding to the first candidate value is A2, quantity of the PRACH occasion groups in the second occasion group sub-set corresponding to the second candidate value is B2, the first proportion may be represented as A2:B2, and A1:B1 is equal to A2:B2.

In some embodiments, the plurality of candidate values include the first candidate value, the second candidate value and the third candidate value, and a ratio of quantity of the PRACH occasion groups in each occasion group sub-set of the plurality of PRACH occasion group sub-sets corresponding to the first candidate value to quantity of the PRACH occasion groups in each occasion group sub-set of the plurality of PRACH occasion group sub-sets corresponding to the second candidate value and to quantity of the PRACH occasion groups in each occasion group sub-set of the plurality of PRACH occasion group sub-sets corresponding to the third candidate value is the first proportion.

In some embodiments, the plurality of candidate values include the first candidate value, the second candidate value and the third candidate value, and the plurality of PRACH occasion group sub-sets include the first occasion group sub-set and the second occasion group sub-set. A ratio of quantity of the PRACH occasion groups in the first occasion group sub-set corresponding to the first candidate value to quantity of the PRACH occasion groups in the first occasion group sub-set corresponding to the second candidate value and to quantity of the PRACH occasion groups in the first occasion group sub-set corresponding to the third candidate value is the first proportion. A ratio of quantity of the PRACH occasion groups in the second occasion group sub-set corresponding to the first candidate value to quantity of the PRACH occasion groups in the second occasion group sub-set corresponding to the second candidate value and to quantity of the PRACH occasion groups in the second occasion group sub-set corresponding to the third candidate value is the first proportion.

As an example, quantity of the PRACH occasion groups in each occasion group sub-set of the plurality of PRACH occasion group sub-sets corresponding to the first candidate value is A, quantity of the PRACH occasion groups in each occasion group sub-set of the plurality of PRACH occasion group sub-sets corresponding to the second candidate value is B, quantity of the PRACH occasion groups in each occasion group sub-set of the plurality of PRACH occasion group sub-sets corresponding to the third candidate value is C, and the first proportion may be represented as A: B: C.

As an example, quantity of the PRACH occasion groups in the first occasion group sub-set corresponding to the first candidate value is A1, quantity of the PRACH occasion groups in the first occasion group sub-set corresponding to the second candidate value is B1, quantity of the PRACH occasion groups in the first occasion group sub-set corresponding to the third candidate value is C1, and the first proportion may be represented as A1:B1:C1. Quantity of the PRACH occasion groups in the second occasion group sub-set corresponding to the first candidate value is A2, quantity of the PRACH occasion groups in the second occasion group sub-set corresponding to the second candidate value is B2, quantity of the PRACH occasion groups in the second occasion group sub-set corresponding to the third candidate value is C2, the first proportion may be represented as A2:B2:C2, and A1:B1:C1 is equal to A2:B2:C2.

In some embodiments, the first proportion is fixed.

In some embodiments, the first proportion is configurable.

In some embodiments, the first proportion is configured by high-level signaling or higher-level signaling. For example, the first proportion is configured by RRC signaling and/or MAC CE signaling.

In some embodiments, the first proportion is a ratio of quantity of the PRACH occasion groups to be determined that correspond to the plurality of candidate values, respectively.

In some embodiments, the plurality of candidate values include the first candidate value and the second candidate value, and the first proportion is a ratio of quantity of the PRACH occasion groups to be determined corresponding to the first candidate value to quantity of the PRACH occasion groups to be determined corresponding to the second candidate value.

In some embodiments, the plurality of candidate values include the first candidate value, the second candidate value and the third candidate value, and the first proportion is a ratio of quantity of the PRACH occasion groups to be determined corresponding to the first candidate value to quantity of the PRACH occasion groups to be determined corresponding to the second candidate value and to quantity of the PRACH occasion groups to be determined corresponding to the third candidate value.

In some embodiments, the first proportion is equal to a greatest common divisor of quantity of the PRACH occasion groups to be determined corresponding to the plurality of candidate values, respectively.

In some embodiments, each occasion group sub-set of the plurality of PRACH occasion group sub-sets includes X1 respective PRACH occasions of the X PRACH occasions, and in each occasion group sub-set of the plurality of PRACH occasion group sub-sets, the plurality of candidate values are used, in a descending order, for mapping of the X1 respective PRACH occasions to the Q1 respective PRACH occasion groups.

In some embodiments, each occasion group sub-set of the plurality of PRACH occasion group sub-sets includes X1 respective PRACH occasions of the X PRACH occasions, the plurality of candidate values include the first candidate value and the second candidate value, and the first candidate value is greater than the second candidate value. In each occasion group sub-set of the plurality of PRACH occasion group sub-sets, the mapping of the X1 respective PRACH occasions corresponding to the first candidate value to the Q1 respective PRACH occasion groups is prioritized, and then the mapping of the X1 respective PRACH occasions corresponding to the second candidate value to the Q1 respective PRACH occasion groups is performed.

In some embodiments, each occasion group sub-set of the plurality of PRACH occasion group sub-sets includes X1 respective PRACH occasions of the X PRACH occasions, the plurality of candidate values include the first candidate value, the second candidate value and the third candidate value, the first candidate value is greater than the second candidate value, and the second candidate value is greater than the third candidate value. In each occasion group sub-set of the plurality of PRACH occasion group sub-sets, the mapping of the X1 respective PRACH occasions corresponding to the first candidate value to the Q1 respective PRACH occasion groups is prioritized, then the mapping of the X1 respective PRACH occasions corresponding to the second candidate value to the Q1 respective PRACH occasion groups is performed, and at last the mapping of the X1 respective PRACH occasions corresponding to the third candidate value to the Q1 respective PRACH occasion groups is performed.

In some embodiments, each occasion group sub-set of the plurality of PRACH occasion group sub-sets includes X1 respective PRACH occasions of the X PRACH occasions, and in each occasion group sub-set of the plurality of PRACH occasion group sub-sets, the greater value(s) of the plurality of candidate values is prioritized for the mapping of the X1 respective PRACH occasions to the Q1 respective PRACH occasion groups.

In some embodiments, each occasion group sub-set of the plurality of PRACH occasion group sub-sets includes X1 respective PRACH occasions of the X PRACH occasions, and in each occasion group sub-set of the plurality of PRACH occasion group sub-sets, the greater one of the first candidate value and the second candidate value is prioritized for the mapping of the X1 respective PRACH occasions to the Q1 respective PRACH occasion groups. The first candidate value and the second candidate value are two of the plurality of candidate values.

In some embodiments, each occasion group sub-set of the plurality of PRACH occasion group sub-sets includes X1 respective PRACH occasions of the X PRACH occasions, and in each occasion group sub-set of the plurality of PRACH occasion group sub-sets, the maximum value of the plurality of candidate values is prioritized for the mapping of the X1 respective PRACH occasions to the Q1 respective PRACH occasion groups.

In the process of mapping of the X PRACH occasions to the Q PRACH occasion groups, the mapping of the X1 respective PRACH occasions to the Q1 respective PRACH occasion groups is determined according to occasion group sub-sets. In this way, it can be ensured that when the first node uses a ROG having a relatively small size for multiple PRACH transmissions, random access resources can be found in different cycles, which is conducive to balancing random access delay and collision probability. In other words, it is conducive to reduction of orphan PRACH occasions and of random access delay.

Hereinbefore, it is illustrated that in the process of mapping of the X PRACH occasions to the Q PRACH occasion groups, a greater one of the plurality of candidate values is prioritized for mapping of the PRACH occasions to the PRACH occasion groups, and/or that the quantity of the PRACH occasion groups corresponding to the plurality of candidate values, respectively, are used for the mapping of the PRACH occasions to the PRACH occasion groups. By taking these factors into account, it is conducive to optimization of the mapping scheme of the PRACH occasions to the PRACH occasion groups, thereby reducing or preventing generation of orphan PRACH occasions, or taking these factors into account is conducive to reduction of waste of resources, or taking these factors into account is conducive to optimization of allocation of resources for multiple PRACH transmissions, or taking these factors into account is conducive to improvement of performance gain of multiple PRACH transmissions and to increase of coverage range, or taking these factors into account is conducive to reduction of random access delay and to improvement of utilization efficiency of random access resources.

For case of understanding, with reference to FIGS. 6 and 7, two implementations of the mapping of the PRACH occasions to the PRACH occasion groups are illustrated below.

Implementation One: the plurality of candidate values are used, in a descending order, for the mapping of ROs to ROGs When the plurality of candidate values include 2 and 4, in the process of mapping ROs to ROGs, X1 PRACH occasion groups corresponding to candidate value 4 may be determined first, and then X2 PRACH occasion groups corresponding to candidate value 2 are determine. In other words, when the plurality of ROG sizes include 2 and 4, in the process of mapping ROs to ROGs, X1 PRACH occasion groups having a ROG size of 4 may be determined first, and then X2 PRACH occasion groups having a ROG size of 2 are determine.

When the plurality of candidate values include 2, 4 and 8, in the process of mapping ROs to ROGs, X1 PRACH occasion groups corresponding to candidate value 8 may be determined first, then X2 PRACH occasion groups corresponding to candidate value 4 are determine, and at last X3 PRACH occasion groups corresponding to candidate value 2 are determine. In other words, when the plurality of ROG sizes include 2, 4 and 8, in the process of mapping ROs to ROGs, X1 PRACH occasion groups having a ROG size of 8 may be determined first, then X2 PRACH occasion groups having a ROG size of 4 are determine, and at last X3 PRACH occasion groups having a ROG size of 2 are determine.

Figure 6:
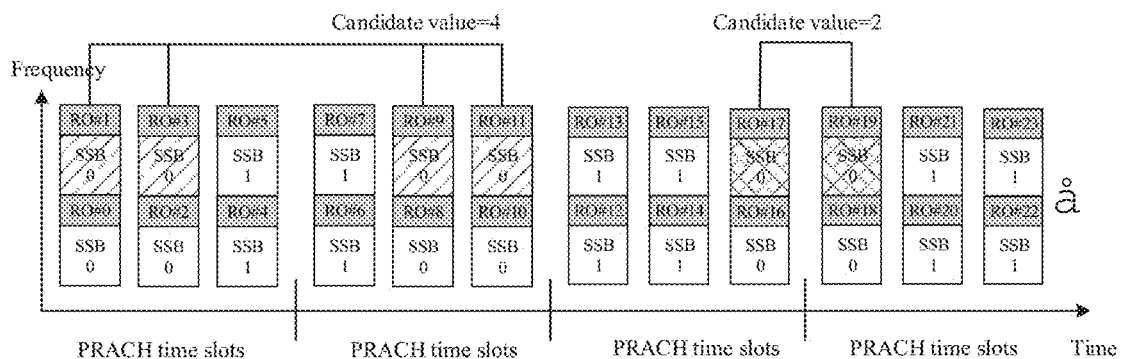
FIG. 6 is a schematic diagram of an implement of the mapping of RO to ROG according to some embodiments of the present disclosure.

As shown in FIG. 6, in the example shown in FIG. 6, the plurality of candidate values include 2 and 4, in a descending order of the plurality of candidate values, the PRACH occasion groups corresponding to candidate value 4 are determined first. Referring to the PRACH occasion groups having a ROG size of 4 shown in FIG. 6, these PRACH occasion groups having a ROG size of 4 include RO #1, RO #3, RO #9 and RO #11. Then, the PRACH occasion groups corresponding to candidate value 2 are determined. Referring to the PRACH occasion groups having a ROG size of 2 shown in FIG. 6, these PRACH occasion groups having a ROG size of 2 include RO #17 and RO #19.

In some embodiments, when the plurality of candidate values are used for the mapping of ROs to ROGs in a descending order, if the first node (such as the first node with good channel quality) chooses a relatively small candidate value (ROGs having a relatively small size) for the multiple PRACH transmissions, it may lead to that available ROG resources are positioned backward, resulting in a relatively high random access delay of the first node.

Implementation Two: in each occasion group sub-set, the plurality of candidate values are used, in a descending order, for the mapping of ROs to ROGs For the PRACH occasion groups corresponding to the plurality of candidate values (the plurality of ROG sizes), the PRACH occasion groups corresponding to different candidate values (different ROG sizes) may be determined according to a certain proportional factor (such as the first proportion as mentioned above). The PRACH occasion groups corresponding to these different candidate values are in a same occasion group sub-set.

In some embodiments, in each occasion group sub-set, determination of the PRACH occasion groups corresponding to a relatively great candidate value (a relatively great ROG size) may be prioritized.

In some embodiments, after the mapping of the PRACH occasions to the PRACH occasion groups in an occasion group sub-set, the mapping of the PRACH occasions to the PRACH occasion groups in a next occasion group sub-set may be performed, until the mapping of the X PRACH occasions to the Q PRACH occasion groups is finished.

Figure 7:
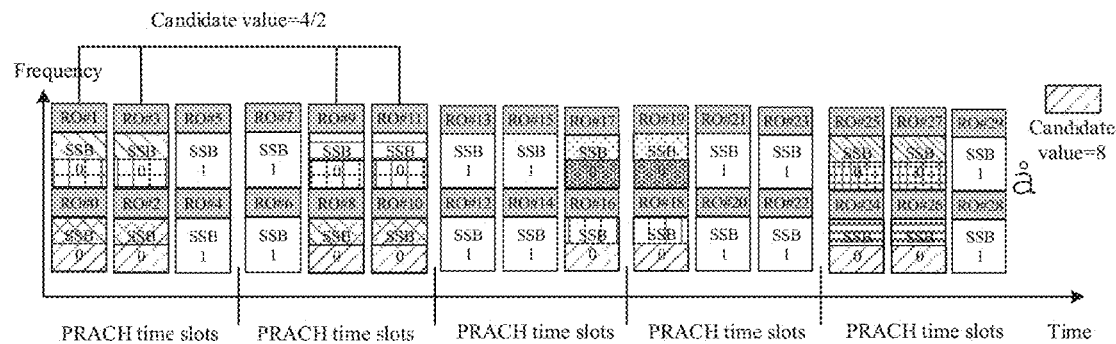
FIG. 7 is a schematic diagram of another implement of the mapping of RO to ROG according to some embodiments of the present disclosure.

Referring to FIG. 7, in the example as shown in FIG. 7, the plurality of candidate values include 2, 4, and 8, quantity of ROGs to be determined having a ROG size of 8 is S1, quantity of ROGs to be determined having a ROG size of 4 is S2, and quantity of ROGs to be determined having a ROG size of 2 is S3. As an implementation, according to a certain proportional factor (for example, a ratio of the quantity of ROGs having the ROG size of 8 to the quantity of ROGs having the ROG size of 4 and to the quantity of ROGs having the ROG size of 2 is t1: t2: t3), Y1 ROGs having the ROG size of 8 may be determined first, then Y2 ROGs having the ROG size of 4 are determined, and at last Y3 ROGs having the ROG size of 2 are determined, where Y1=a*t1 and Y1 is not greater than S1, Y2-a*t2 and Y2 is not greater than S2, Y3=a*t3 and Y3 is not greater than S3. After determining a set of Y1+Y2+Y3 ROGs, the next set of Y1+Y2+Y3 ROGs is determined until the remaining ROs cannot meet the requirement of the mapping to a set of Y1+Y2+Y3 ROGs. Then, the remaining ROs are assigned to the ROGs having one or two sizes, where t1: t2: t3 may be the greatest common divisor of S1: S2: S3.

As shown in FIG. 7, the proportional factor (the first proportion) of the quantity of the ROGs corresponding to the plurality of candidate values (2, 4 and 8) is 1:2:8, according to this proportion, Y1 ROGs having the ROG size of 8 are determined first (in the example as shown in FIG. 7, 1 ROG having the ROG size of 8 is determined first), then Y2 ROGs having the ROG size of 4 are determined (in the example as shown in FIG. 7, 2 ROGs having the ROG size of 4 are determined), and at last Y3 ROGs having the ROG size of 2 are determined (in the example as shown in FIG. 7, 8 ROGs having the ROG size of 2 are determined). After determining a set of Y1+Y2+Y3 ROGs, the next set of Y1+Y2+Y3 ROGs is determined until the remaining ROs cannot meet the requirement of the mapping to a set of Y1+Y2+Y3 ROGs. Then, the remaining ROs are assigned to the ROGs having one or two sizes of the ROG sizes.

With the mapping scheme provided by Implementation Two, it can be ensured that when the first node uses ROGs having a relatively small size for the multiple PRACH transmissions, random access resources can be found in different cycles, thereby balancing random access delay and collision probability. In other words, the mapping scheme provided by Implementation Two can reduce the random access delay of the multiple PRACH transmissions occupying ROGs having a relatively small size, thereby improving the performance gain of the multiple PRACH transmissions, increasing coverage range, and improving the utilization efficiency of random access resources.

In some embodiments, in addition to the factors as illustrated above, the mapping of the X PRACH occasions to the Q PRACH occasion groups may be related to other information, the embodiments of the present disclosure are not limited to this. In the following, some other information will be illustrated exemplarily.

In some embodiments, the mapping of the X PRACH occasions to the Q PRACH occasion groups is related to one or more of: quantity of frequency division multiplexed PRACH occasions in a time instance; quantity of synchronization signal blocks associated with each of the X PRACH occasions; and quantity of random access preambles corresponding to each of a plurality of synchronization signal blocks associated with the X PRACH occasions.

In some embodiments, the mapping of the X PRACH occasions to the Q PRACH occasion groups is related to the quantity of frequency division multiplexed PRACH occasions in a time instance. In other words, when the quantity of frequency division multiplexed PRACH occasions in a time instance varies, the determined Q PRACH occasion groups may vary.

In some embodiments, the mapping of the X PRACH occasions to the Q PRACH occasion groups is related to quantity of synchronization signal blocks associated with each of the X PRACH occasions. In other words, when the quantity of synchronization signal blocks associated with each of the X PRACH occasions varies, the determined Q PRACH occasion groups may vary.

In some embodiments, the mapping of the X PRACH occasions to the Q PRACH occasion groups is related to quantity of random access preambles corresponding to each of a plurality of synchronization signal blocks associated with the X PRACH occasions. In other words, when the quantity of random access preambles corresponding to each of a plurality of synchronization signal blocks associated with the X PRACH occasions varies, the determined Q PRACH occasion groups may vary.

In some embodiments, the mapping of the X PRACH occasions to the Q PRACH occasion groups is related to the quantity of frequency division multiplexed PRACH occasions in a time instance, and with the quantity of synchronization signal blocks associated with each of the X PRACH occasions.

In some embodiments, the mapping of the X PRACH occasions to the Q PRACH occasion groups is related to the quantity of frequency division multiplexed PRACH occasions in a time instance, with quantity of synchronization signal blocks associated with each of the X PRACH occasions, and with quantity of random access preambles corresponding to each of a plurality of synchronization signal blocks associated with the X PRACH occasions.

In some embodiments, after performing the mapping of ROs to ROGs, the first node may select one or more ROGs of the determined ROGs to perform random access. This process will be illustrated with reference to FIG. 8 below.

Figure 8:
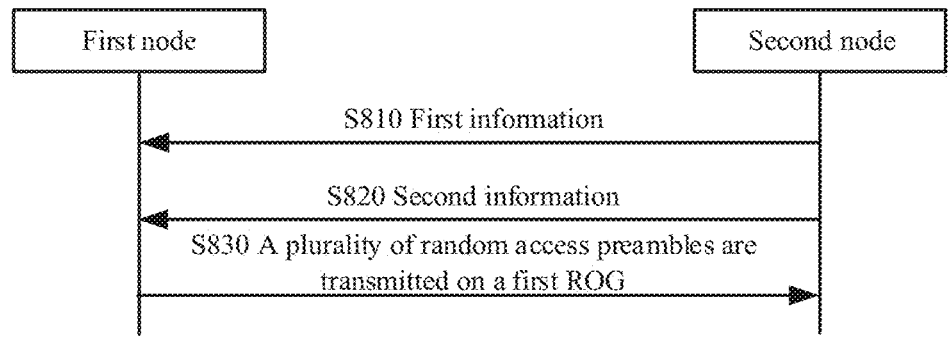
FIG. 8 is a flowchart of another method applicable to a node for wireless communication provided in some embodiments of the present disclosure.

FIG. 8 is a flowchart of another method applicable to a node for wireless communication provided in some embodiments of the present disclosure. The method as shown in FIG. 8 is illustrated from the perspective of the interaction between the first and second nodes. The first and second nodes have been illustrated above, and will not be repeated here.

The method as shown in FIG. 8 may include operations S810 to S830.

At S810, the first node receives first information. The first information is used to determine X PRACH occasions.

At S820, the first node receives second information. The second information is used to determine a plurality of candidate values.

For the illustration of the operations S810 and S820, reference may be made to the above illustration of the operations S510 and S520. For simplicity, it will not be repeated here.

At S830, the first node transmits a plurality of random access preambles on a first PRACH occasion group.

In some embodiments, the first node transmits the plurality of random access preambles to a second node on the first PRACH occasion group.

In some embodiments, at least two random access preambles of the plurality of random access preambles are identical to each other.

In some embodiments, any two random access preambles of the plurality of random access preambles are identical to each other. In other words, during the multiple PRACH transmissions, identical random access preambles may be transmitted repeatedly on the first PRACH occasion group, in order to enhance the coverage capability of PRACHs.

In some embodiments, the first PRACH occasion group is one respective PRACH occasion group of the Q PRACH occasion groups. For example, the first PRACH occasion group may be any one of the Q PRACH occasion groups.

In some embodiments, the first PRACH occasion group includes one or more PRACH occasions, and the one or more PRACH occasions in the first PRACH occasion group are configured to transmit the plurality of random access preambles.

In some embodiments, the first PRACH occasion group includes only one PRACH occasion, and the one PRACH occasion in the first PRACH occasion group is configured to transmit one random access preamble. In other words, the first PRACH occasion group includes only one PRACH occasion, and one random access preamble is transmitted on the one PRACH occasion in the first PRACH occasion group.

In some embodiments, the first PRACH occasion group includes a plurality of PRACH occasions, and the plurality of PRACH occasions in the first PRACH occasion group are configured to transmit the plurality of random access preambles, respectively. In other words, the first PRACH occasion group includes the plurality of PRACH occasions, and the plurality of random access preambles are transmitted on the plurality of PRACH occasions in the first PRACH occasion group, respectively.

In some embodiments, a first sequence is used to generate the plurality of random access preambles. In other words, the plurality of random access preambles transmitted on the first PRACH occasion group are generated using the first sequence.

The embodiments of the present disclosure do not specify the first sequence used to generate the plurality of random access preambles. In some embodiments, the first sequence may be some sequences having good cross correlation and autocorrelation characteristics. Below are several examples of the first sequences.

In some embodiments, the first sequence is a pseudo-random sequence. In some other embodiments, the first sequence is a M sequence. In some other embodiments, the first sequence is a Gold sequence. The present disclosure is not limited to this, for example, the first sequence may also be one or more of a Kasami sequence, a Barker sequence, a Zadoff-Chu sequence, and the like.

In some embodiments, the first sequence is a single sequence. For example, the first sequence is a M sequence, the first sequence is a Gold sequence, or the like.

In some embodiments, the first sequence is a combination of a plurality of sequences. For example, the first sequence is a combination of pseudo-random sequences and M sequences, a combination of pseudo-random sequences and Gold sequences, or the like.

In some embodiments, the above-mentioned X PRACH occasions are within a first cycle.

In some embodiments, the first cycle refers to a mapping cycle for mapping PRACH occasions to PRACH occasion groups.

In some embodiments, the first cycle refers to a mapping cycle for mapping synchronization signal blocks to PRACH occasions.

In some embodiments, the mapping cycle for mapping synchronization signal blocks to PRACH occasions and the mapping cycle for mapping PRACH occasions to PRACH occasion groups are a same cycle.

In some embodiments, the first cycle refers to an association period for the mapping of the X PRACH occasions to the Q PRACH occasion groups.

In some embodiments, the first cycle refers to an association period for mapping indexes of a plurality of candidate synchronization signal blocks to the X PRACH occasions.

In some embodiments, the association period for the mapping of the X PRACH occasions to the Q PRACH occasion groups and the association period for mapping indexes of the plurality of candidate synchronization signal blocks to the X PRACH occasions are a same period.

In some embodiments, the first cycle refers to an association pattern period including one or more association periods.

In some embodiments, the first cycle refers to a PRACH configuration cycle.

In some embodiments, the first cycle is the minimum value in a set determined by the PRACH configuration cycle.

In some embodiments, reference may be made to Table 1 for the set determined by the PRACH configuration cycle, that is, the value of the first cycle may be determined based on Table 1.

TABLE 1

| PRACH configuration cycle (msec) | First cycle (quantity of PRACH configuration cycle) |
|---|---|
| 10 | {1, 2, 4, 8, 16} |
| 20 | {1, 2, 4, 8} |
| 40 | {1, 2, 4} |
| 80 | {1, 2} |
| 160 | {1} |

In some embodiments, the first cycle starts from frame number 0.

In some embodiments, the mapping of the X PRACH occasions to the Q PRACH occasion groups is performed in the first cycle.

In some embodiments, the first cycle includes one or more PRACH time slots. Taking the first cycle including a plurality of PRACH time slots as an example, the first cycle may include 2 or more PRACH time slots.

In some embodiments, each of the X PRACH occasions is a corresponding PRACH time slot of the plurality of PRACH time slots in the first cycle.

In some embodiments, the first cycle includes a plurality of PRACH occasions.

As mentioned above, the mapping of the X PRACH occasions to the Q PRACH occasion groups is related to quantity of PRACH occasion groups respectively corresponding to each candidate value of the plurality of candidate values. How to determine the quantity of PRACH occasion groups respectively corresponding to each candidate value of the plurality of candidate values will be illustrated below.

Figure 9:
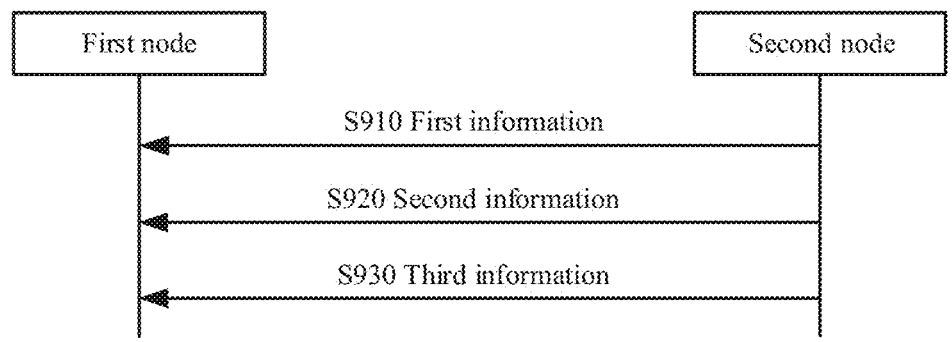
FIG. 9 is a flowchart of still another method applicable to a node for wireless communication provided in some embodiments of the present disclosure.

FIG. 9 is a flowchart of still another method applicable to a node for wireless communication provided in some embodiments of the present disclosure. The method as shown in FIG. 9 is illustrated from the perspective of the interaction between the first and second nodes. The first and second nodes have been illustrated above, and will not be repeated here.

The method as shown in FIG. 9 may include operations S910 to S930.

At S910, the first node receives first information. The first information is used to determine X PRACH occasions.

At S920, the first node receives second information. The second information is used to determine a plurality of candidate values.

For the illustration of the operations S910 and S920, reference may be made to the above illustration of the operations S510 and S520. For simplicity, it will not be repeated here.

At S930, the first node receives third information. The third information is used to determine quantity of PRACH occasion groups corresponding to at least one candidate value of the plurality of candidate values. In other words, the third information is used to determine quantity of multiple PRACH transmissions corresponding to at least one candidate value of the plurality of candidate values.

In some embodiments, the third information is transmitted to the first node by the second node.

In some embodiments, the third information is used to indicate the quantity of PRACH occasion groups corresponding to at least one candidate value of the plurality of candidate values.

In some embodiments, the third information is used to determine a ratio of quantity of PRACH occasion groups of the Q PRACH occasion groups that correspond to the plurality of candidate values, respectively.

In some embodiments, the ratio of quantity of PRACH occasion groups of the Q PRACH occasion groups that correspond to the plurality of candidate values, respectively, is equal to the first proportion. Reference may be made to the above illustration of the first proportion. For simplicity, it will not be repeated here.

In some embodiments, the third information is used to determine the first proportion.

In some embodiments, quantity of random access preambles corresponding to at least one candidate value of the plurality of candidate values is used to determine the Q PRACH occasion groups.

In some embodiments, quantity of random access preambles in any one of the plurality of PRACH occasion group sub-sets corresponding to at least one candidate value of the plurality of candidate values is used to determine the Q PRACH occasion groups.

In some embodiments, the relatively great value(s) of the plurality of candidate values are prioritized for determination of the Q PRACH occasion groups, and the quantity of random access preambles corresponding to at least one candidate value of the plurality of candidate values is used to determine the Q PRACH occasion groups.

In some embodiments, the maximum value of the plurality of candidate values are prioritized for determination of the Q PRACH occasion groups, and the quantity of random access preambles corresponding to at least one candidate value of the plurality of candidate values is used to determine the Q PRACH occasion groups.

In some embodiments, the relatively great value(s) of the plurality of candidate values are determined from the plurality of candidate values in a descending order and are prioritized for determination of the Q PRACH occasion groups, and the quantity of random access preambles corresponding to at least one candidate value of the plurality of candidate values is used to determine the Q PRACH occasion groups.

In some embodiments, the at least one PRACH occasion group corresponding to each of the plurality of candidate values is mapped in a first mapping order, and the first mapping order includes one or more of: an increment order of indexes of random access preambles, an increment order of frequency resources, and an increment order of time resources.

In some embodiments, the at least one PRACH occasion group corresponding to each of the plurality of candidate values is mapped in the first mapping order, i.e. the at least one PRACH occasion group is mapped in an increment order of indexes of random access preambles first, then is mapped in an increment order of frequency resources, and at last is mapped in an increment order of time resources.

In some embodiments, the at least one PRACH occasion group corresponding to a same candidate value is mapped in the first mapping order.

In some embodiments, the at least one PRACH occasion group corresponding to a same ROG size is mapped in the first mapping order.

In some embodiments, after determination of the mapping of the X PRACH occasions to the Q PRACH occasion groups, the first node and/or the second node may perform random access based on the mapping relationships. For ease of understanding, the following will take a four-step random access process as an example to illustrate the random access processes of the first and second nodes.

Figure 10:
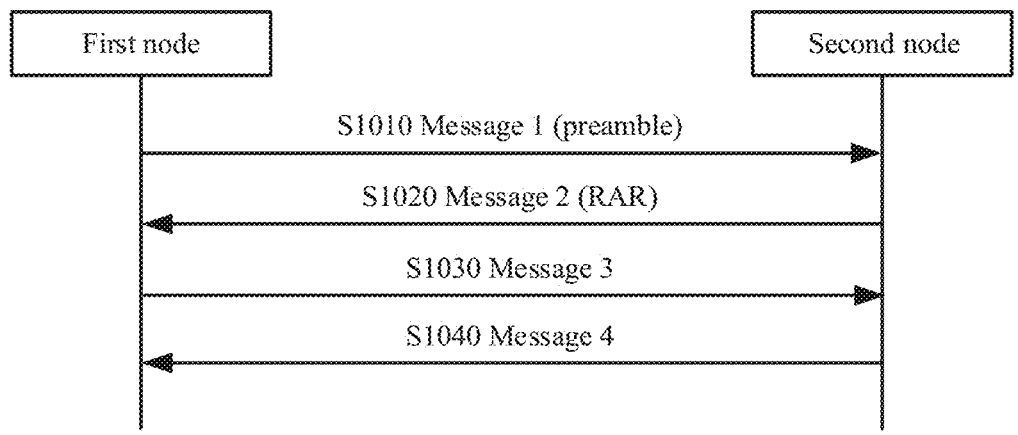
FIG. 10 is a flowchart of yet another method applicable to a node for wireless communication provided in some embodiments of the present disclosure.

FIG. 10 is a flowchart of the four-step random access process. As shown in FIG. 10, the four-step random access process may include operations S1010 to S1040.

At S1010 (the first operation), the first node transmits random access preambles to the second node. For example, the first node transmits a plurality of random access preambles to the second node on a first PRACH occasion group.

In some embodiments, for the operation S1010, reference may be made to the above illustration of the operation S830.

In some embodiments, the first node transmits a plurality of random access preambles (also known as message 1, Msg1, etc.) to the second node on the PRACH resources of the first PRACH occasion group.

In some embodiments, the first PRACH occasion group is any one PRACH occasion group of the Q PRACH occasion groups.

At S1020 (the second operation), the second node transmits, after detecting the Msg1, a PDCCH scrambled by a random access radio network temporary identifier (RA-RNTI) to the first node.

In some embodiments, the PDCCH may be transmitted through the resources in the Type1-PDCCH common search space (CSS) on the downlink initial BWP.

In some embodiments, the PDSCH scheduled by this PDCCH may include the random access response (RAR, also known as message 2, Msg2, etc.) corresponding to the preamble transmitted by the first node.

Correspondingly, the first node uses RA-RNTI to detect PDCCH on the Type1-PDCCH CSS on the downlink initial BWP, and determines, after detecting the PDCCH, whether the PDCCH includes the RAR transmitted by the second node to the first node based on the PDSCH scheduled by the PDCCH. The RAR may include information such as uplink authorization for message 3 (Msg3), timing advance command (TA command), temporary cell RNTI (TC-RNTI), and the like.

In some embodiments, Type1-PDCCH CSS is configured by the second node through system messages and/or high-level parameters.

At S1030 (the third operation), after receiving the RAR, the first node transmits message 3 (Msg3) on the uplink resources indicated by the RAR.

In some embodiments, this operation supports HARQ retransmission. That is to say, when the second node does not receive Msg3 correctly, the first node can use PDCCH scrambled by TC-RNTI to schedule the retransmission of Msg3, and this PDCCH can carry the DCI format 0_0.

At S1040 (the fourth operation), the second node transmits message 4 (Msg4) to the first node, the message 4 includes a contention resolution message.

In some embodiments, this operation supports HARQ retransmission. When the first node does not receive Msg4 correctly, the second node can use PDCCH scrambled by TC-RNTI to schedule the retransmission of Msg4, and this PDCCH can carry the DCI format 1_0. When the first node correctly receives Msg4 and confirms that the Msg4 is a message for the first node, then the random access process of the first node is successful; otherwise, the random access process fails, and the first node needs to initiate the random access process again from the first operation.

The method embodiments of the present disclosure are illustrated in detail above, with reference to FIGS. 1 to 10. The device embodiments of the present disclosure will be illustrated in detail below, with reference to FIGS. 11 to 14. It should be understood that the illustration of the method embodiments corresponds to the illustration of the device embodiments, therefore, the parts that are not illustrated in detail may refer to the method embodiments above.

Figure 11:
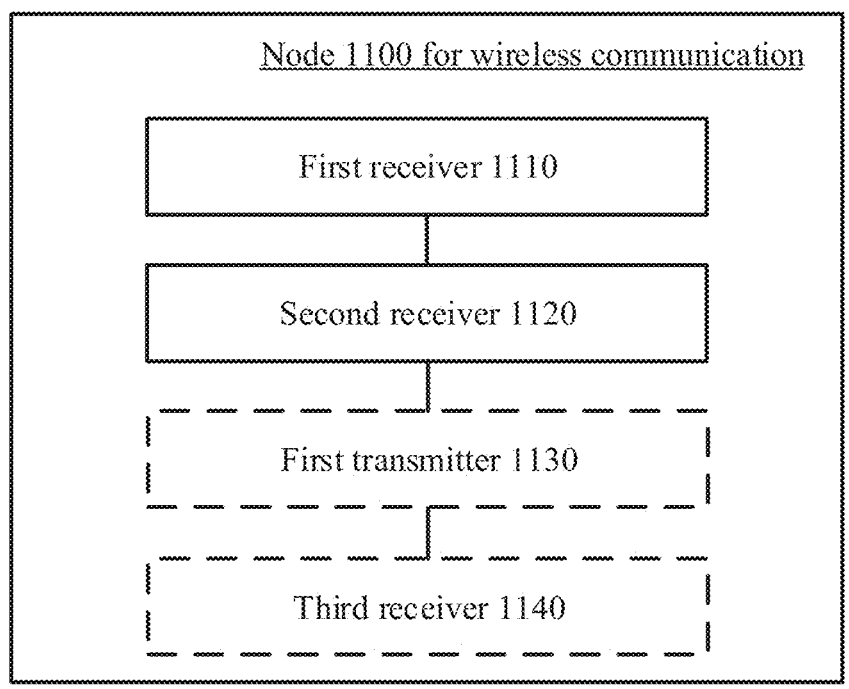
FIG. 11 is a schematic diagram of a structure of a node for wireless communication provided in some embodiments of the present disclosure.

FIG. 11 is a schematic diagram of a structure of a node for wireless communication provided in some embodiments of the present disclosure. The node 1100 as shown in FIG. 11 may be the first node as illustrated above, and the node 1100 may include a first receiver 1110 and a second receiver 1120.

The first receiver 1110 may be configured to receive first information, and the first information is used to determine X PRACH occasions. The X PRACH occasions are mapped to Q PRACH occasion groups, X is a positive integer greater than 1, and Q is a positive integer.

The second receiver 1120 may be configured to receive second information, and the second information is used to determine a plurality of candidate values. Quantity of PRACH occasions in each of the Q PRACH occasion groups is a corresponding candidate value of the plurality of candidate values. The plurality of candidate values include a first candidate value and a second candidate value, and a greater one of the first candidate value and the second candidate value is prioritized for mapping of the X PRACH occasions to the Q PRACH occasion groups; and/or the mapping of the X PRACH occasions to the Q PRACH occasion groups is related to quantity of PRACH occasion groups respectively corresponding to each candidate value of the plurality of candidate values.

In some embodiments, the first node further includes a first transmitter 1130 configured to transmit a plurality of random access preambles on a first PRACH occasion group. The first PRACH occasion group is one of the Q PRACH occasion groups, and a first sequence is used to generate each random access preamble of the plurality of random access preambles.

In some embodiments, the X PRACH occasions are within a first cycle.

In some embodiments, the PRACH occasions in each of the Q PRACH occasion groups are orthogonal to each other in time domain; or the PRACH occasions in each of the Q PRACH occasion groups are related to a same synchronization signal block; or the PRACH occasions in each of the Q PRACH occasion groups are orthogonal to each other in time domain and are related to a same synchronization signal block.

In some embodiments, the plurality of candidate values are used, in a descending order, for the mapping of the X PRACH occasions to the Q PRACH occasion groups.

In some embodiments, each occasion group sub-set of a plurality of PRACH occasion group sub-sets includes Q1 respective PRACH occasion groups of the Q PRACH occasion groups, each of the plurality of candidate values corresponds to at least one respective PRACH occasion group of the Q1 respective PRACH occasion groups in each occasion group sub-set of the plurality of PRACH occasion group sub-sets, and any two occasion group sub-sets of the plurality of PRACH occasion group sub-sets corresponding to any one of the plurality of candidate values have same quantity of PRACH occasion groups.

In some embodiments, quantity of the at least one respective PRACH occasion group in each occasion group sub-set of the plurality of PRACH occasion group sub-sets corresponding to one respective candidate value of the plurality of candidate values corresponds to a value, and values corresponding to the plurality of candidate values are in a first proportion.

In some embodiments, each occasion group sub-set of the plurality of PRACH occasion group sub-sets includes X1 respective PRACH occasions of the X PRACH occasions, and in each occasion group sub-set of the plurality of PRACH occasion group sub-sets, the plurality of candidate values are used, in a descending order, for mapping of the X1 respective PRACH occasions to the Q1 respective PRACH occasion groups.

In some embodiments, the mapping of the X PRACH occasions to the Q PRACH occasion groups is related to one or more of: quantity of frequency division multiplexed PRACH occasions in a time instance; quantity of synchronization signal blocks associated with each of the X PRACH occasions; and quantity of random access preambles corresponding to each of a plurality of synchronization signal blocks associated with the X PRACH occasions.

In some embodiments, the first node further includes a third receiver 1140 configured to receive third information used to determine quantity of PRACH occasion groups corresponding to at least one candidate value of the plurality of candidate values.

In some embodiments, quantity of random access preambles corresponding to at least one candidate value of the plurality of candidate values is used to determine the Q PRACH occasion groups.

In some embodiments, at least one PRACH occasion group corresponding to each of the plurality of candidate values is mapped in a first mapping order, and the first mapping order includes one or more of: an increment order of indexes of random access preambles, an increment order of frequency resources, and an increment order of time resources.

In some embodiments, the first information is used to determine at least one of: a respective quantity of synchronization signal blocks corresponding to each PRACH occasion of the X PRACH occasions, and quantity of random access preambles corresponding to the synchronization signal blocks corresponding to each PRACH occasion of the X PRACH occasions.

In some embodiments, each of the Q PRACH occasion groups includes a respective plurality of PRACH occasions, and at least two PRACH occasion groups of the Q PRACH occasion groups include at least one PRACH occasion different from each other, respectively.

In some embodiments, each of the Q PRACH occasion groups includes a respective plurality of PRACH occasions, the Q PRACH occasion groups correspond to a plurality of random access preambles, and random access preambles corresponding to at least two of the Q PRACH occasion groups are different from each other.

Figure 13:
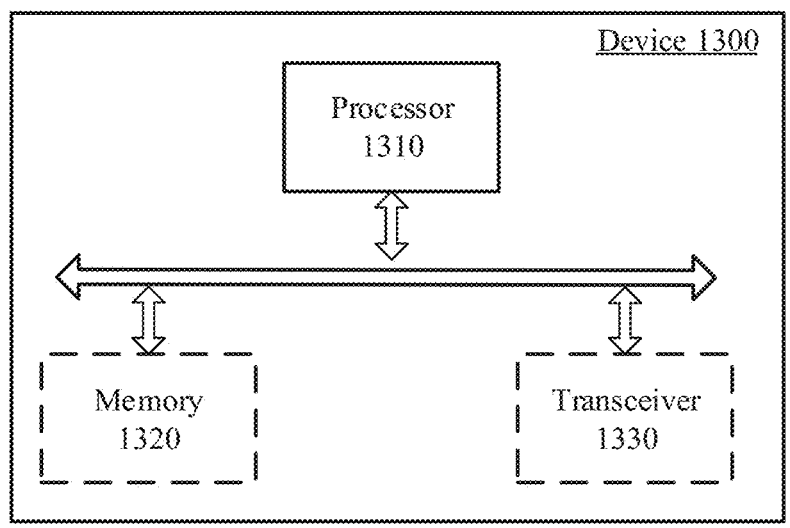
FIG. 13 is a schematic diagram of a structure of a device provided in some embodiments of the present disclosure.

In some embodiments, the first receiver 1110 and the second receiver 1120 may be implemented as a transceiver 1330. The node 1100 may further include a processor 1310 and a memory 1320, as shown in FIG. 13.

Figure 12:
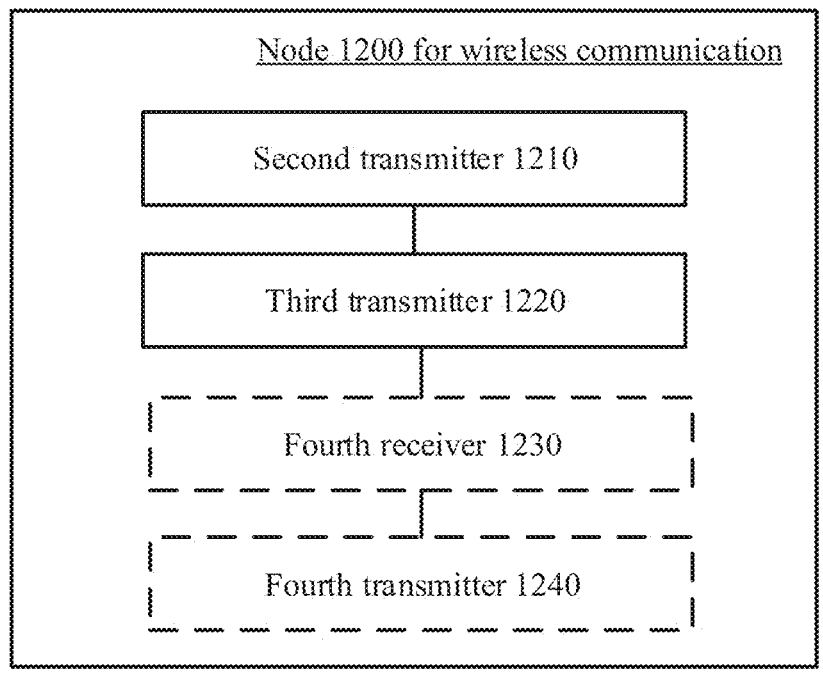
FIG. 12 is a schematic diagram of a structure of another node for wireless communication provided in some embodiments of the present disclosure.

FIG. 12 is a schematic diagram of a structure of another node for wireless communication provided in some embodiments of the present disclosure. The node 1200 as shown in FIG. 12 may be the second node as illustrated above, and the node 1200 may include a second transmitter 1210 and a third transmitter 1220.

The second transmitter 1210 may be configured to transmit first information used to determine X PRACH occasions. The X PRACH occasions are mapped to Q PRACH occasion groups, X is a positive integer greater than 1, and Q is a positive integer.

The third transmitter 1220 may be configured to transmit second information used to determine a plurality of candidate values. Quantity of PRACH occasions in each of the Q PRACH occasion groups is a corresponding candidate value of the plurality of candidate values. The plurality of candidate values include a first candidate value and a second candidate value, and a greater one of the first candidate value and the second candidate value is prioritized for mapping of the X PRACH occasions to the Q PRACH occasion groups; and/or the mapping of the X PRACH occasions to the Q PRACH occasion groups is related to quantity of PRACH occasion groups respectively corresponding to each candidate value of the plurality of candidate values.

In some embodiments, the second node further includes a fourth receiver 1230 configured to receive a plurality of random access preambles transmitted on a first PRACH occasion group. The first PRACH occasion group is one of the Q PRACH occasion groups, and a first sequence is used to generate each random access preamble of the plurality of random access preambles.

In some embodiments, the X PRACH occasions are within a first cycle.

In some embodiments, the PRACH occasions in each of the Q PRACH occasion groups are orthogonal to each other in time domain; or the PRACH occasions in each of the Q PRACH occasion groups are related to a same synchronization signal block; or the PRACH occasions in each of the Q PRACH occasion groups are orthogonal to each other in time domain and are related to a same synchronization signal block.

In some embodiments, the plurality of candidate values are used, in a descending order, for the mapping of the X PRACH occasions to the Q PRACH occasion groups.

In some embodiments, each occasion group sub-set of a plurality of PRACH occasion group sub-sets includes Q1 respective PRACH occasion groups of the Q PRACH occasion groups, each of the plurality of candidate values corresponds to at least one respective PRACH occasion group of the Q1 respective PRACH occasion groups in each occasion group sub-set of the plurality of PRACH occasion group sub-sets, and any two occasion group sub-sets of the plurality of PRACH occasion group sub-sets corresponding to any one of the plurality of candidate values have same quantity of PRACH occasion groups.

In some embodiments, quantity of the at least one respective PRACH occasion group in each occasion group sub-set of the plurality of PRACH occasion group sub-sets corresponding to one respective candidate value of the plurality of candidate values corresponds to a value, and values corresponding to the plurality of candidate values are in a first proportion.

In some embodiments, each occasion group sub-set of the plurality of PRACH occasion group sub-sets includes X1 respective PRACH occasions of the X PRACH occasions, and in each occasion group sub-set of the plurality of PRACH occasion group sub-sets, the plurality of candidate values are used, in a descending order, for mapping of the X1 respective PRACH occasions to the Q1 respective PRACH occasion groups.

In some embodiments, the mapping of the X PRACH occasions to the Q PRACH occasion groups is related to one or more of: quantity of frequency division multiplexed PRACH occasions in a time instance; quantity of synchronization signal blocks associated with each of the X PRACH occasions; and quantity of random access preambles corresponding to each of a plurality of synchronization signal blocks associated with the X PRACH occasions.

In some embodiments, the second node further includes a fourth transmitter 1240 configured to transmit third information used to determine quantity of PRACH occasion groups corresponding to at least one candidate value of the plurality of candidate values.

In some embodiments, quantity of random access preambles corresponding to at least one candidate value of the plurality of candidate values is used to determine the Q PRACH occasion groups.

In some embodiments, at least one PRACH occasion group corresponding to each of the plurality of candidate values is mapped in a first mapping order, and the first mapping order includes one or more of: an increment order of indexes of random access preambles, an increment order of frequency resources, and an increment order of time resources.

In some embodiments, the first information is used to determine at least one of: a respective quantity of synchronization signal blocks corresponding to each PRACH occasion of the X PRACH occasions, and quantity of random access preambles corresponding to the synchronization signal blocks corresponding to each PRACH occasion of the X PRACH occasions.

In some embodiments, each of the Q PRACH occasion groups includes a respective plurality of PRACH occasions, and at least two PRACH occasion groups of the Q PRACH occasion groups include at least one PRACH occasion different from each other, respectively.

In some embodiments, each of the Q PRACH occasion groups includes a respective plurality of PRACH occasions, the Q PRACH occasion groups correspond to a plurality of random access preambles, and random access preambles corresponding to at least two of the Q PRACH occasion groups are different from each other.

In some embodiments, the second transmitter 1210 and the third transmitter 1220 may be implemented as a transceiver 1330. The node 1200 may further include a processor 1310 and a memory 1320, as shown in FIG. 13.

FIG. 13 is a schematic diagram of a structure of a communication device provided in some embodiments of the present disclosure. The dashed lines in FIG. 13 indicate that the units or modules are optional. The device 1300 may be configured to implement the methods as described in the foregoing method embodiments. The device 1300 may be implemented as a chip, user equipment, or a network device.

The device 1300 may include one or more processors 1310. The one or more processors 1310 may allow the device 1300 to implement the methods as described in the foregoing method embodiments. The one or more processors 1310 may be one or more general-purpose processors or dedicated processors. For example, the one or more processors may be one or more central processing units (CPUs). Alternatively, the one or more processors may be other general-purpose processors, digital signal processors (DSPs), application-specific integrated circuits (ASICs), field-programmable gate arrays (FPGAs) or other programmable logic devices, discrete gates or transistor logic devices, or discrete hardware components, or the like. The general-purpose processors may be microprocessors, or any conventional processors, or the like.

The device 1300 may further include one or more memories 1320. The one or more memories 1320 store programs that may be executed by the one or more processors 1310 to cause the one or more processors 1310 to perform the methods as described in the foregoing method embodiments. The one or more memories 1320 may be independent of the one or more processors 1310 or may be integrated in the one or more processors 1310.

The device 1300 may further include the transceiver 1330. The one or more processors 1310 may communicate with other devices or chips through the transceiver 1330. For example, the one or more processors 1310 may transmit data to and receive data from other devices or chips through the transceiver 1330.

Figure 14:
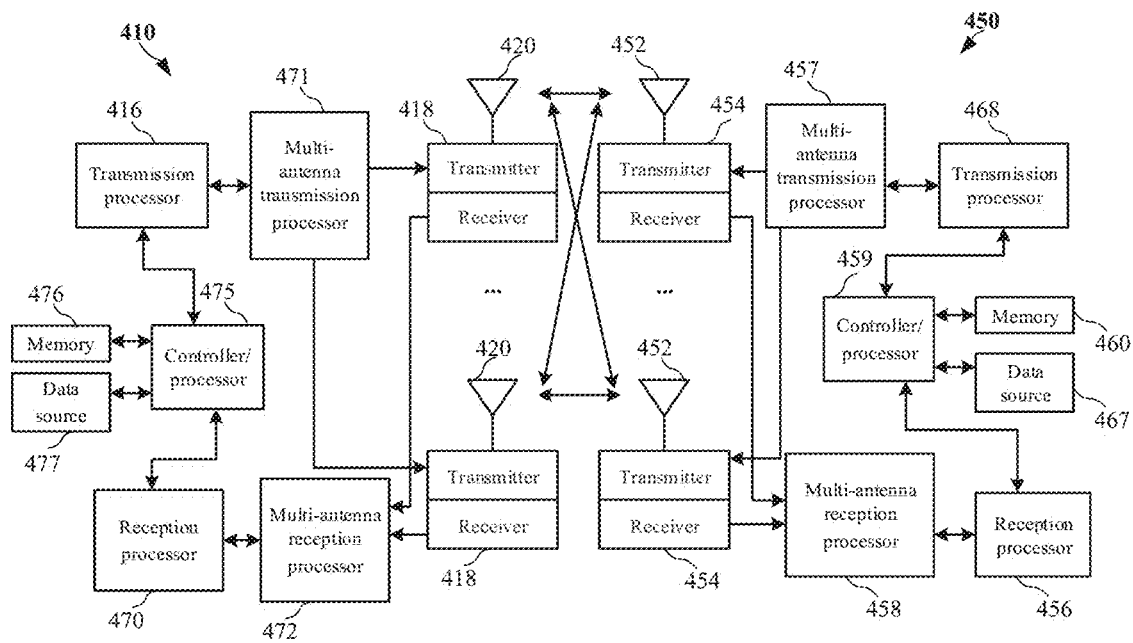
FIG. 14 is a schematic diagram of hardware modules of a communication apparatus provided in some embodiments of the present disclosure.

FIG. 14 is a schematic diagram of hardware modules of a communication apparatus provided in some embodiments of the present disclosure. FIG. 14 shows block diagrams of a first communication apparatus 450 and a second communication apparatus 410 communicating with each other in the access network.

The first communication apparatus 450 includes a controller/processor 459, a memory 460, a data source 467, a transmission processor 468, a reception processor 456, a multi-antenna transmission processor 457, a multi-antenna reception processor 458, a transmitter/receiver 454, and an antenna 452.

The second communication apparatus 410 includes a controller/processor 475, a memory 476, a data source 477, a reception processor 470, a transmission processor 416, a multi-antenna reception processor 472, a multi-antenna transmission processor 471, a transmitter/receiver 418, and an antenna 420.

In the transmission from the second communication apparatus 410 to the first communication apparatus 450, at the second communication apparatus 410, upper-layer data packets from the core network or from the data source 477 are provided to the controller/processor 475. The core network and data source 477 represent all protocol layers above the L2 layer. The controller/processor 475 implements the functionality of the L2 layer. In the transmission from the second communication apparatus 410 to the first communication apparatus 450, the controller/processor 475 provides header compression, encryption, packet segmentation and reordering, multiplexing between logic and transport channels, and wireless resource allocation for the first communication apparatus 450 based on various priority metrics. The controller/processor 475 is also responsible for re-transmitting lost packets and signaling to the first communication apparatus 450. The transmission processor 416 and the multi-antenna transmission processor 471 implement various signal processing functions for the L1 layer (i.e., the physical layer). The transmission processor 416 implements encoding and interleaving to facilitate forward error correction at the second communication apparatus 410, as well as mapping of signal clusters based on various modulation schemes (such as binary phase shift keying, orthogonal phase shift keying, M-phase shift keying, M-orthogonal amplitude modulation). The multi-antenna transmission processor 471 performs digital spatial precoding (including codebook-based precoding and non-codebook-based precoding) on the encoded and modulated symbols, and beam-forming processing to generate one or more spatial streams. The transmission processor 416 then maps each spatial stream to subcarriers, multiplexes the subcarriers with a reference signal (such as a pilot) in the time domain and/or frequency domain, and then uses inverse fast Fourier transform to generate a physical channel for carrying time-domain multi-carrier symbol streams. Subsequently, the multi-antenna transmission processor 471 performs simulated precoding/beamforming operations on the time-domain multi-carrier symbol streams. Each transmitter 418 converts the baseband multi-carrier symbol streams provided by the multi-antenna transmission processor 471 into RF streams, which are then provided to different antennas 420.

In the transmission from the second communication apparatus 410 to the first communication apparatus 450, at the first communication apparatus 450, each receiver 454 receives signals through its corresponding antenna 452. Each receiver 454 recovers the information modulated onto the RF carriers and converts the RF streams into baseband multi-carrier symbol streams, which are provided to the reception processor 456. The reception processor 456 and the multi-antenna reception processor 458 implement various signal processing functions of the L1 layer. The multi-antenna reception processor 458 performs reception analog pre-coding/beamforming operations on the baseband multi-carrier symbol streams from the receiver 454. The reception processor 456 uses fast Fourier transform to convert, from the time domain, the baseband multi-carrier symbol streams subjected to reception analog pre-coding/beamforming operations to the frequency domain. In the frequency domain, the physical layer data signal and reference signal are demultiplexed by the reception processor 456, where the reference signal is used for channel estimation, and the data signals are detected by multiple antennas in the multi-antenna reception processor 458 to recover any spatial flow destined for the first communication apparatus 450. The symbols on each spatial stream are demodulated and recovered in the reception processor 456, and soft decisions are generated. Subsequently, the reception processor 456 decodes and de-interleaves the soft decision to recover the upper-layer data and control signals transmitted by the second communication apparatus 410 on the physical channels. Subsequently, the upper-layer data and control signals are provided to the controller/processor 459. The controller/processor 459 implements L2 layer functionality. The controller/processor 459 may be related to the memory 460 for storing program codes and data. The memory 460 may be referred to as a computer-readable medium. In the transmission from the second communication s 410 to the first communication apparatus 450, the controller/processor 459 provides multiplexing, packet reassembly, decryption, header decompression, and control signal processing between the transport channels and logical channels to recover the upper-layer data packets from the second communication apparatus 410. Subsequently, the upper-layer packets are provided to all protocol layers above the L2 layer. Various control signals may also be provided to L3 for processing at L3.

In the transmission from the first communication apparatus 450 to the second communication apparatus 410, at the first communication apparatus 450, the upper-layer data packets are provided to the controller/processor 459 using the data source 467. The data source 467 represents all protocol layers above the L2 layer. Similar to the transmission function described at the second communication apparatus 410 in the transmission from the second communication apparatus 410 to the first communication apparatus 450, the controller/processor 459 implements header compression, encryption, packet segmentation and reordering, as well as multi-channel multiplexing between logic channels and transport channels, thereby implementing L2 layer functions for the user plane and control plane. The controller/processor 459 is also responsible for re-transmitting lost packets and signaling to the second communication apparatus 410. The transmission processor 468 performs modulation mapping and channel coding processing, and the multi-antenna transmission processor 457 performs digital multi-antenna spatial precoding (including codebook-based precoding and non-codebook-based precoding) and beamforming processing. Subsequently, the transmission processor 468 modulates the generated spatial streams into multi-carrier/single-carrier symbol streams, which, after the simulated pre-coding/beamforming in the multi-antenna transmission processor 457, are then provided to different antennas 452 through the transmitters 454. Each transmitter 454 first converts the baseband symbol streams provided by the multi-antenna transmission processor 457 into RF symbol streams, and then provides them to antennas 452.

In the transmission from the first communication apparatus 450 to the second communication apparatus 410, the functions at the second communication apparatus 410 are similar to the reception functions at the first communication apparatus 450 described in the transmission from the second communication apparatus 410 to the first communication apparatus 450. Each receiver 418 receives RF signals through its corresponding antenna 420, converts the received RF signals into baseband signals, and provides the baseband signals to the multi-antenna reception processor 472 and reception processor 470. The reception processor 470 and the multi-antenna reception processor 472 jointly implement the functions of the L1 layer. The controller/processor 475 implements the functions of L2 layer. The controller/processor 475 may be related to the memory 476 for storing program codes and data. The memory 476 may be referred to as a computer-readable medium. In the transmission from the first communication apparatus 450 to the second communication apparatus 410, the controller/processor 475 provides multiplexing, packet reassembly, decryption, header decompression, and control signal processing between the transport channels and logical channels to recover the upper-layer data packets from the first communication apparatus 450. The upper-layer data packets from the controller/processor 475 may be provided to the core network or to all protocol layers above L2 layer, and various control signals may also be provided to the core network or L3 for the processing at L3.

In some embodiments, the first communication apparatus 450 includes at least one processor and at least one memory. The at least one memory includes computer program codes. The at least one memory and the computer program codes are configured to be used in conjunction with the at least one processor. The first communication apparatus 450 at least: receives first information used to determine X PRACH occasions, where the X PRACH occasions are mapped to Q PRACH occasion groups, X is a positive integer greater than 1, and Q is a positive integer; and receives second information used to determine a plurality of candidate values. Quantity of PRACH occasions in each of the Q PRACH occasion groups is a corresponding candidate value of the plurality of candidate values. The plurality of candidate values include a first candidate value and a second candidate value, and a greater one of the first candidate value and the second candidate value is prioritized for mapping of the X PRACH occasions to the Q PRACH occasion groups; and/or the mapping of the X PRACH occasions to the Q PRACH occasion groups is related to quantity of PRACH occasion groups respectively corresponding to each candidate value of the plurality of candidate values.

In some embodiments, the first communication apparatus 450 device includes a memory for storing computer-readable instruction programs, which, when being executed by at least one processor, cause the at least one processor to perform operations, including: receiving first information used to determine X PRACH occasions, where the X PRACH occasions are mapped to Q PRACH occasion groups, X is a positive integer greater than 1, and Q is a positive integer; and receiving second information used to determine a plurality of candidate values. Quantity of PRACH occasions in each of the Q PRACH occasion groups is a corresponding candidate value of the plurality of candidate values. The plurality of candidate values include a first candidate value and a second candidate value, and a greater one of the first candidate value and the second candidate value is prioritized for mapping of the X PRACH occasions to the Q PRACH occasion groups; and/or the mapping of the X PRACH occasions to the Q PRACH occasion groups is related to quantity of PRACH occasion groups respectively corresponding to each candidate value of the plurality of candidate values.

In some embodiments, the first communication apparatus 450 corresponds to the first node in the present disclosure.

In some embodiments, the second communication apparatus 410 corresponds to the second node in the present disclosure.

In some embodiments, the first communication apparatus 450 is a NCR.

In some embodiments, the first communication apparatus 450 is a wireless repeater station.

In some embodiments, the first communication apparatus 450 is a relay.

In some embodiments, the first communication apparatus 450 is user equipment, which may function as a relay node.

In some embodiments, the first communication apparatus 450 is user equipment supporting V2X, and the user equipment may function as a relay node.

In some embodiments, the first communication apparatus 450 is user equipment supporting D2D, and the user equipment may function as a relay node.

In some embodiments, the second communication apparatus 410 is a base station.

In some embodiments, the antenna 452, the receiver 454, the multi-antenna reception processor 458, the reception processor 456, and the controller/processor 459 are used to receive the first and/or second information in the present disclosure.

In some embodiments, the antenna 420, the transmitter 418, the multi-antenna transmission processor 471, the transmission processor 416, and the controller/processor 475 are used to transmit the first and/or second information in the present disclosure.

The embodiments of the present disclosure further provide a computer-readable storage medium configured to store programs. The computer-readable storage medium may be applicable to the terminal device or network device provided in the embodiments of the present disclosure, and the programs cause the computer to execute the operations of the methods performed by the terminal device or network device in the embodiments of the present disclosure.

The embodiments of the present disclosure further provide a computer program product including programs. The computer program product may be applicable to the terminal device or network device provided in the embodiments of the present disclosure, and the programs cause the computer to execute the operations of the methods performed by the terminal device or network device in the embodiments of the present disclosure.

The embodiments of the present disclosure further provide a computer program. The computer program may be applicable to the terminal device or network device provided in the embodiments of the present disclosure, and the computer program causes the computer to execute the operations of the methods performed by the terminal device or network device in the embodiments of the present disclosure.

It should be understood that the terms "system" and "network" in the present disclosure may be used interchangeably. In addition, the terms used in the present disclosure are only used to explain the embodiments of the present disclosure, and are not intended to limit the present disclosure. The terms "first", "second", "third", "fourth", and the like in the description, claims, and drawings of the present disclosure are used to distinguish different objects, rather than to describe a specific order. In addition, the terms "comprise" and "have" and any variations thereof are intended to cover a non-exclusive inclusion.

In the embodiments of the present disclosure, "indicate" mentioned herein may refer to a direct indication, or may refer to an indirect indication, or may mean that there is an association relationship. For example, A indicates B, which may mean that A directly indicates B, for example, B may be obtained by means of A; or may mean that A indirectly indicates B, for example, A indicates C, and B may be obtained by means of C; or may mean that there is an association relationship between A and B.

In the embodiments of the present disclosure, "B corresponding to A" means that B is related to A, and B may be determined based on A. However, it should also be understood that, determining B based on A does not only mean determining B based only on A, but instead B may be determined based on A and/or other information.

In the embodiments of the present disclosure, the term "corresponding" may mean that there is a direct or indirect correspondence between the two, or may mean that there is an association relationship between the two, or may mean that there is a relationship such as indicating and being indicated, or configuring and being configured.

In the embodiments of the present disclosure, "pre-defined" or "pre-configured" may be implemented by pre-storing corresponding codes, tables, or other forms that may be used to indicate related information in devices (for example, including the terminal device and the network device), and specific implementations thereof are not limited in the present disclosure. For example, pre-defined may refer to defined in protocols.

In the embodiments of the present disclosure, the "protocol" may refer to a standard protocol in the communications field, and may include, for example, an LTE protocol, an NR protocol, and a related protocol applied to a future communications system, which is not limited in the present disclosure.

In the embodiments of the present disclosure, the term "and/or" is merely used to describe an association relationship between associated objects, indicating that there may be three relationships. For example, A and/or B may indicate that: only A exists, both A and B exist, and only B exists. In addition, the character "/" herein generally indicates an "or" relationship between the associated objects.

In the embodiments of the present disclosure, sequence quantity of the foregoing processes do not mean execution sequences. The execution sequences of the processes should be determined according to functions and internal logics of the processes, and should not be construed as any limitation on the implementation processes of the embodiments of the present disclosure.

In the embodiments provided in the present disclosure, it should be understood that, the disclosed system, apparatus, and method may be implemented in other manners. For example, the described apparatus embodiments are merely examples. For example, the division of units is merely logical function division and there may be other division manners in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to an actual need to achieve the objectives of the solutions of the embodiments.

In addition, function units in the embodiments of the present disclosure may be integrated into one processing unit, or each of the units may exist alone physically, or two or more units are integrated into one unit.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on a computer, the procedures or functions according to the embodiments of the present disclosure are completely or partially generated. The computer may be a general-purpose computer, a dedicated computer, a computer network, or other programmable apparatuses. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (such as a coaxial cable, an optical fiber, and a digital subscriber line (DSL)) manner or a wireless (such as infrared, wireless, and microwave) manner. The computer-readable storage medium may be any usable medium readable by the computer, or a data storage device, such as a server or a data center formed by integrating one or more usable medium. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

The foregoing descriptions are merely specific implementations of the present disclosure, but the protection scope of the present disclosure is not limited thereto. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A first node, comprising:
   at least one processor; and
   one or more memories coupled to the at least one processor and storing programming instructions for execution by the at least one processor to cause the first node to perform operations comprising:
   receiving first information, the first information comprises information indicating X physical random access channel (PRACH) occasions, wherein the X PRACH occasions are mapped to Q PRACH occasion groups, X is a positive integer greater than 1, and Q is a positive integer; and
   receiving second information, the second information comprises a plurality of candidate values, wherein a quantity of PRACH occasions in each of the Q PRACH occasion groups is one candidate value of a plurality of candidate values, wherein a value of the plurality of candidate values corresponds to a priority for random access resources selection.

2. The first node according to claim 1, wherein each of the plurality of candidate values is one of {2, 4, 8}.

3. The first node according to claim 1, wherein the plurality of candidate values include {2, 4, 8}.

4. The first node according to claim 1, wherein a candidate value of 8 corresponds to the highest priority.

5. The first node according to claim 1, wherein the operations further comprise:
   transmitting a same random access preamble repeatedly for a plurality of times on a first PRACH occasion group using a same spatial filter;
   wherein the first PRACH occasion group is one of the Q PRACH occasion groups.

6. The first node according to claim 1, wherein the X PRACH occasions are within a first cycle.

7. The first node according to claim 1, wherein the PRACH occasions in each of the Q PRACH occasion groups are orthogonal to each other in time domain; or
   the PRACH occasions in each of the Q PRACH occasion groups are related to a same synchronization signal block; or
   the PRACH occasions in each of the Q PRACH occasion groups are orthogonal to each other in time domain and are related to a same synchronization signal block.

8. The first node according to claim 1, wherein the X PRACH occasions are mapped to the Q PRACH occasion groups based on one or more of:
   a quantity of frequency division multiplexed PRACH occasions in a time instance;
   a quantity of synchronization signal blocks associated with each of the X PRACH occasions; or
   a quantity of random access preambles corresponding to each of a plurality of synchronization signal blocks associated with the X PRACH occasions.

9. The first node according to claim 1, wherein at least one PRACH occasion group corresponding to each of the plurality of candidate values is mapped in a first mapping order, and the first mapping order comprises one or more of:
   an increasing order of indexes of random access preambles;
   an increasing order of frequency resources; and
   an increasing order of time resources.

10. The first node according to claim 1, wherein the first information indicates at least one of:
    a respective quantity of synchronization signal blocks corresponding to each PRACH occasion of the X PRACH occasions; or
    a quantity of random access preambles corresponding to the synchronization signal blocks corresponding to each PRACH occasion of the X PRACH occasions.

11. The first node according to claim 1, wherein a maximum value of the plurality of candidate values corresponds to a highest priority for random access resources selection.

12. A method, comprising:
    receiving, by a first node, first information, the first information comprises information indicating X physical random access channel (PRACH) occasions, wherein the X PRACH occasions are mapped to Q PRACH occasion groups, X is a positive integer greater than 1, and Q is a positive integer; and
    receiving, by the first node, second information, the second information comprises a plurality of candidate values, wherein a quantity of PRACH occasions in each of the Q PRACH occasion groups is one candidate value of a plurality of candidate values, wherein a value of the plurality of candidate values corresponds to a priority for random access resources selection.

13. The method according to claim 12, wherein each of the plurality of candidate values is one of {2, 4, 8}.

14. The method according to claim 12, wherein the plurality of candidate values include {2, 4, 8}.

15. The method according to claim 12, wherein a candidate value of 8 corresponds to the highest priority.

16. The method according to claim 12, further comprising:
    transmitting a same random access preamble repeatedly for a plurality of times on a first PRACH occasion group using a same spatial filter;
    wherein the first PRACH occasion group is one of the Q PRACH occasion groups.

17. The method according to claim 12, wherein the X PRACH occasions are within a first cycle.

18. The method according to claim 12, wherein the PRACH occasions in each of the Q PRACH occasion groups are orthogonal to each other in time domain; or
    the PRACH occasions in each of the Q PRACH occasion groups are related to a same synchronization signal block; or
    the PRACH occasions in each of the Q PRACH occasion groups are orthogonal to each other in time domain and are related to a same synchronization signal block.

19. The method according to claim 12, wherein the X PRACH occasions are mapped to the Q PRACH occasion groups based on one or more of:
    a quantity of frequency division multiplexed PRACH occasions in a time instance;
    a quantity of synchronization signal blocks associated with each of the X PRACH occasions; or
    a quantity of random access preambles corresponding to each of a plurality of synchronization signal blocks associated with the X PRACH occasions.

20. One or more non-transitory computer-readable media storing computer instructions, that when executed by one or more processors, cause a computing device to perform operations comprising:
receiving first information, the first information comprises information indicating X physical random access channel (PRACH) occasions, wherein the X PRACH occasions are mapped to Q PRACH occasion groups, X is a positive integer greater than 1, and Q is a positive integer; and
receiving second information, the second information comprises a plurality of candidate values, wherein a quantity of PRACH occasions in each of the Q PRACH occasion groups is one candidate value of a plurality of candidate values, wherein a value of the plurality of candidate values corresponds to a priority for random access resources selection.

* * * * *